United States Patent
Fyke et al.

(10) Patent No.: US 7,890,257 B2
(45) Date of Patent: Feb. 15, 2011

(54) USING A SHAPE-CHANGING DISPLAY AS AN ADAPTIVE LENS FOR SELECTIVELY MAGNIFYING INFORMATION DISPLAYED ONSCREEN

(75) Inventors: Steven H. Fyke, Waterloo (CA); Norman M. Ladouceur, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 500 days.

(21) Appl. No.: 12/013,933

(22) Filed: Jan. 14, 2008

(65) Prior Publication Data

US 2009/0182501 A1    Jul. 16, 2009

(51) Int. Cl.
*G01C 21/30* (2006.01)
(52) U.S. Cl. ............. 701/208; 701/211; 701/212; 340/995.15; 340/995.27
(58) Field of Classification Search ............. 701/200, 701/207, 208, 209, 211, 212, 213, 300; 340/995.15, 340/995.16, 995.26, 995.27; 455/95
See application file for complete search history.

(56) References Cited

U.S. PATENT DOCUMENTS

| | | | |
|---|---|---|---|
| 5,739,946 | A | 4/1998 | Iwanaga et al. |
| 6,073,036 | A | 6/2000 | Heikkinen |
| 6,287,485 | B1 | 9/2001 | Akashi et al. |
| 6,894,677 | B2 | 5/2005 | Kazmaier et al. |
| 7,197,718 | B1 * | 3/2007 | Westerman et al. ......... 715/801 |
| 7,212,332 | B2 | 5/2007 | Chee |
| 2004/0204821 | A1 * | 10/2004 | Tu ............................. 701/200 |
| 2006/0267803 | A1 | 11/2006 | Mathis |
| 2007/0075922 | A1 | 4/2007 | Jessop |

FOREIGN PATENT DOCUMENTS

DE    19519417    11/1996

OTHER PUBLICATIONS

Esmaiel Jabbari et al., "Swelling characteristics of acrylic acid polyelectrolyte hydrogel in a DC electric field" Smart Mater. Struct. (2007) vol. 16, pp. 1614-1620.
Smart Materials: Emerging Markets for Intelligent Gels, Ceramics, Alloys, and Polymers published by Technical Insights, Inc. and available online at http://www.the-infoshop.com/study/ti4914_smart_materials.html.

* cited by examiner

*Primary Examiner*—Gertrude Arthur Jeanglaud
(74) *Attorney, Agent, or Firm*—Ogilvy Renault LLP

(57) ABSTRACT

A method of displaying information on a display of a handheld electronic device includes steps of determining a target area onscreen to be visually magnified and causing a shape-changing zone of the display to change shape in the target area to visually magnify information displayed in the target area. The array of shape-changing zones on the touch-sensitive display can be independently actuated to form a magnifying lens over any onscreen object of interest. For example, this lens can be used to magnify a selected portion of a map, a portion of text or a specific point of interest. The lens can be used to magnify a route displayed on a map, or simply to zoom in on the current location of the device as displayed onscreen.

19 Claims, 13 Drawing Sheets

USING A SHAPE-CHANGING DISPLAY AS AN ADAPTIVE LENS FOR SELECTIVELY MAGNIFYING INFORMATION DISPLAYED ONSCREEN

CROSS-REFERENCE TO RELATED APPLICATIONS

This is the first application filed for the present technology.

TECHNICAL FIELD

The present disclosure relates generally to wireless communications devices and, in particular, to graphical user interfaces or display screens of wireless communications devices.

BACKGROUND

Wireless communications devices such as the BlackBerry® by Research in Motion Limited provide a variety of useful functions, such as voice communication, e-mail and Web browsing. These wireless devices typically include a full QWERTY-style keyboard or a reduced keypad to enable a user to enter alphanumeric text. In addition, either a trackball or a thumbwheel can be provided for scrolling or moving the cursor. Some new-generation devices incorporate touchscreen technology in which the user presses the screen with a finger, thumb or stylus. Touchscreen technology enables the display to present keys for data entry that are customized to the specific application or circumstances. However, one of main shortcomings of touchscreen technology is that they do not provide any tactile feedback to the user. In other words, the absence of any three-dimensional physically protruding keys makes the touchscreen prone to typing or onscreen selection errors. A solution proposed by the applicant is to employ shape-changing touch-sensitive display screens that have shape-changing zones that can be electrically (or possibly also magnetically) actuated to expand to form protruding keys. This technology is described in Applicant's U.S. patent application Ser. No. 11/760,390 entitled "Shape-Changing Display for a Handheld Electronic Device". Shape-changing technologies and related techniques are described in a number of references, e.g. U.S. Pat. Nos. 6,287,485, 7,212,332, 5,739,946, and U.S. Pat. No. 6,894,677.

A general shortcoming of all modern handheld electronic devices, such as the ubiquitous wireless communications devices, is that the limited size of the display screen makes viewing difficult at times. Although most of these handheld devices include basic zoom functions for magnifying the image onscreen, these zoom functions magnify the entire image, thus resulting in an inevitable loss of context (due to the loss of information peripheral to the screen area being zoomed). Accordingly, techniques to selectively magnify an onscreen object (or to zoom in on a portion of the display) remain highly desirable, particularly in the context of the increasingly popular touchscreen devices.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
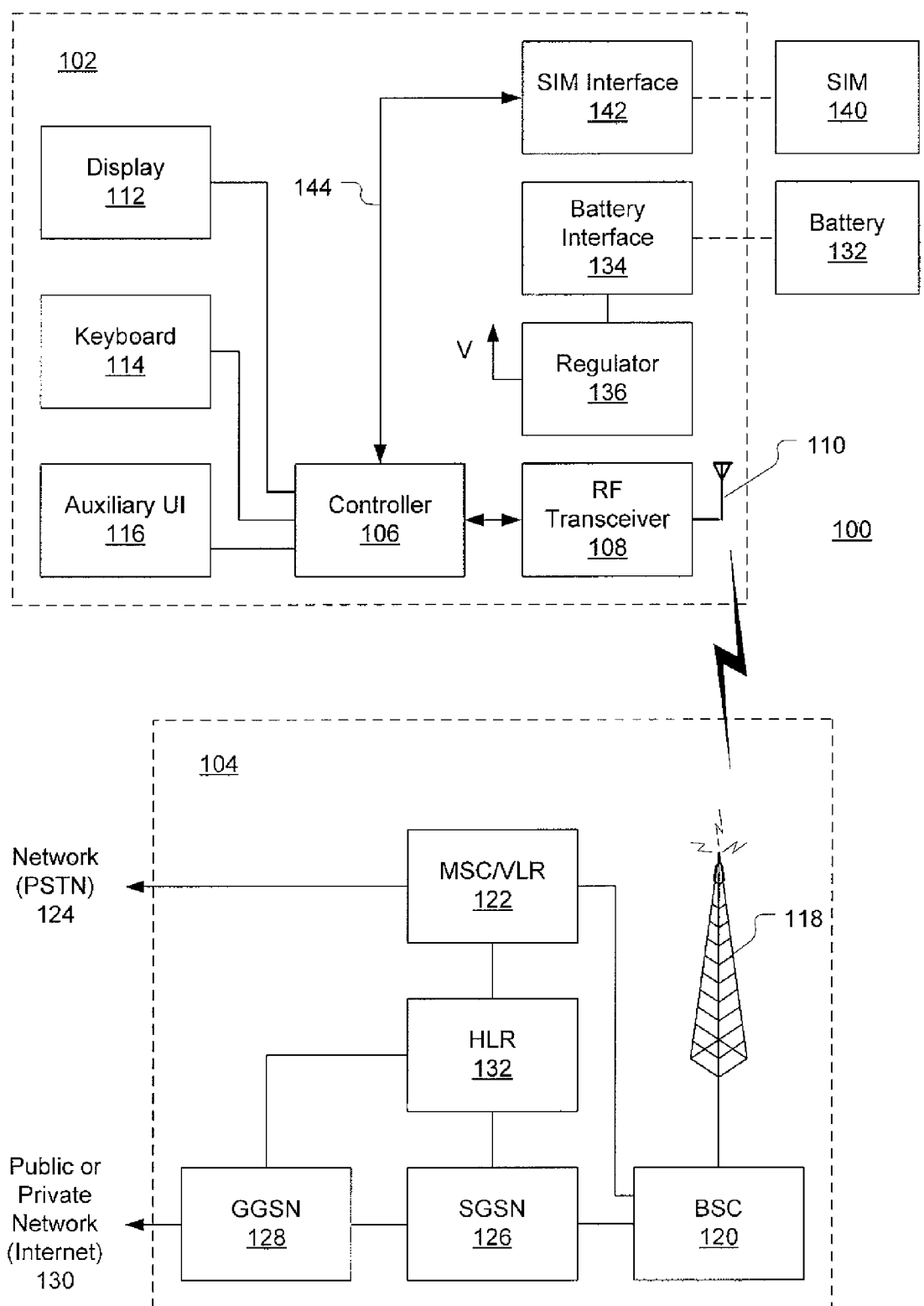
FIG. 1 is a block diagram schematically illustrating pertinent components of a wireless communications device and of a wireless communications network.

The present technology addresses and solves the technical problem of how to selectively magnify only a portion of the onscreen information displayed on a device such as for example a touchscreen device. The present technology employs a shape-changing display screen (that is optionally also touch-sensitive) having an array of shape-changing zones that can be individually actuated. Each of the shape-changing zones defines a pocket containing an electrically responsive gel (or other fluid that can be volumetrically modulated on application of an electric field). By applying electrical stimuli (in the form of an appropriate current or voltage), the shape-changing zones can thus be made to expand or swell into convexly shaped protrusions that are structurally and functionally akin to one or more magnifying lenses. Due to the optical properties of the resulting "lens", i.e. of the actuated shape-changing zone(s), onscreen information displayed beneath the lens is visually magnified. The lens is furthermore said to be "adaptive" because it can be controlled to appear or disappear on demand by the user or as required by a specific application, e.g. a navigation application to magnify a current position or a programmed route. The lens can thus be made to appear over a desired onscreen object, to follow a given route or path, or to appear in the location where the user touches the touchscreen. Alternatively, in lieu of an array of pockets containing shape-changing fluids or gels, a solid layer of shape-changing material can be used (e.g. a shape-changing polymer or alloy that deforms locally when subjected to locally focused electrical or magnetic stimulation).

Thus, an aspect of the present technology is a method of displaying information on a display of a handheld electronic device. The method includes steps of determining a target area onscreen to be visually magnified and causing a shape-changing zone of the display to change shape in the target area to visually magnify information displayed in the target area.

Another aspect of the present technology is a computer program product comprising code adapted to perform the steps of the foregoing method when the computer program product is loaded into memory and executed on a processor of a handheld electronic device.

Yet another aspect of the present technology is a handheld electronic device having a shape-changing touch-sensitive display screen comprising an array of shape-changing zones that can be individually electrically actuated to expand into a convex shape defining an adaptive magnifying lens that visually magnifies an area of the display screen beneath the lens. The device also has a processor operatively coupled to memory for executing an application configured to present information on the touch-sensitive display screen of the device and for controlling actuation of the one or more shape-changing zones of the touch-sensitive display screen.

One of the main applications of this technology is to magnify (or "zoom in" on) maps because generally unlike other types of graphics or plain text displayed onscreen, the ability to maintain the overall context and orientation of the map (by only magnifying the target area of interest) while keeping the peripheral contextual information as is represents a significant benefit to the user. Therefore, the primary application of this technology is directed to viewing maps, routes on maps, or magnifying the current position of the device as plotted in real-time on a map when the device is operating in navigation mode. However, this new technology can also be applied to any other information displayed onscreen, be it mere text (e.g. a MS Word document, a PDF, etc.), an image (e.g. graphics or a digital photograph) or any other information displayed onscreen for which the user may wish to magnify a portion of the information displayed onscreen. Although a substantial portion of the description that follows describes mapping technologies and how maps generated by these mapping technologies can be magnified using the novel shape-changing lens, it should be borne in mind that this novel technology can also be applied to other forms of onscreen information.

The details and particulars of these aspects of the technology will now be described below, by way of example, with reference to the attached drawings.

FIG. 1 is a block diagram of a communication system 100 which includes a wireless communications device 102 (also referred to as a mobile communications device or wireless handheld) which communicates through a wireless communications network 104. For the purposes of the present specification, the expression "wireless communications device" encompasses not only a wireless handheld, cell phone or wireless-enabled laptop but also any mobile communications device or portable communications device such as a satellite phone, wireless-enabled PDA, wireless-enabled MP3 player, or wireless-enabled portable GPS navigation unit. In other words, for the purposes of this specification, "wireless" shall be understood as encompassing not only standard cellular or microwave RF technologies, but also any other communications technique that conveys data over the air using an electromagnetic signal. For the purposes of this specification, it should also be understood that the broader expression "handheld electronic device" encompasses not only "wireless communications devices", as defined above, but also any other non-wireless-enabled handheld electronic device such as a touch-sensitive electronic agenda, PDA, MP3 player, palmtop computer, etc. that does not have a radio-frequency transceiver unit for wireless communication. In other words, non-wireless-enabled devices (which download data using cable connections or which are pre-loaded with information, such as maps) can of course still take full advantage of this novel technology for magnifying onscreen information of particular interest to the viewer.

Notwithstanding the foregoing, the present technology has its greatest utility on a wireless communications device, such as the one introduced in FIG. 1. Such a wireless communications device 102 preferably includes a visual display 112, e.g. an LCD screen, a keyboard 114 (or keypad), and optionally one or more auxiliary user interfaces (UI) 116, each of which is coupled to a controller 106. The controller 106 is also coupled to radio frequency (RF) transceiver circuitry 108 and an antenna 110. Typically, controller 106 is embodied as a central processing unit (CPU) which runs operating system software in a memory device (described later with reference to FIG. 2). Controller 106 normally controls the overall operation of the wireless communications device 102, whereas signal processing operations associated with communications functions are typically performed in the RF transceiver circuitry 108. Controller 106 interfaces with the display screen 112 to display received information, stored information, user inputs, and the like. Keyboard/keypad 114, which may be a telephone-type keypad or a full QWERTY keyboard, is normally provided for entering commands and data.

The wireless communications device 102 sends communication signals to and receives communication signals from network 104 over a wireless link via antenna 110. RF transceiver circuitry 108 performs functions similar to those of station 118 and Base Station Controller (BSC) 120, including, for example, modulation and demodulation, encoding and decoding, and encryption and decryption. It will be apparent to those skilled in the art that the RF transceiver circuitry 108 will be adapted to the particular wireless network or networks in which the wireless communications device is intended to operate.

The wireless communications device 102 includes a battery interface 134 for receiving one or more rechargeable batteries 132. Battery 132 provides electrical power to electrical circuitry in the device 102, and battery interface 134 provides for a mechanical and electrical connection for battery 132. Battery interface 134 is couple to a regulator 136 which regulates power to the device. When the wireless device 102 is fully operationally, an REF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Wireless communications device 102 operates using a Subscriber Identity Module (SIM) 140 which is connected to or inserted in the wireless communications device 102 at a SIM interface 142. SIM 140 is one type of a conventional "smart card" used to identify an end user (or subscriber) of wireless device 102 and to personalize the device, among other things. By inserting the SIM card 140 into the wireless communications device 102, an end user can have access to any and all of his subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical wireless device. SIM 140 may store additional user information for the wireless device as well, including datebook (calendar) information and recent call information. (CDMA handsets may include an equivalent card, namely a Removable User Identity Module (R-UIM) or a CSIM, CDMA Subscriber Identity Module.)

The wireless communications device 102 may consist of a single unit, such as a data communication device, a cellular telephone, a Global Positioning System (GPS) unit or other positioning subsystem, a multiple-function communication device with data and voice communication capabilities, a wireless-enabled personal digital assistant (PDA), or a wireless-enabled laptop computer. Alternatively, the wireless communications device 102 may be a multiple-module unit comprising a plurality of separate components, including but in no way limited to a computer or other device connected to a wireless modem. In particular, for example, in the block diagram of FIG. 1, RF circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU.

The wireless communications device 102 communicates in and through a wireless communication network 104. The wireless communication network may be a cellular telecommunications network. In the example presented in FIG. 1, wireless network 104 is configured in accordance with Global Systems for Mobile communications (GSM) and General Packet Radio Service (GPRS) technologies. Although wireless communication network 104 is described herein as a GSM/GPRS-type network, any suitable network technologies may be utilized such as Code Division Multiple Access (CDMA), Wideband CDMA (WCDMA), whether 2G, 3G, or Universal Mobile Telecommunication System (UMTS) based technologies. In this example, the GSM/GPRS wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is, in turn, coupled to a public or private data network 130 (such as the Internet). HLR 132 is coupled to MSC 122, SGSN 126 and GGSN 128.

Tower station 118 is a fixed transceiver station. Tower station 118 and BSC 120 may be referred to as transceiver equipment. The transceiver equipment provides wireless network coverage for a particular coverage area commonly referred to as a "cell". The transceiver equipment transmits communication signals to and receives communication signals from wireless communications devices 102 within its cell via station 118. The transceiver equipment normally performs such functions as modulation and possibly encoding and/or encryption of signals to be transmitted to the wireless communications device in accordance with particular, usually predetermined, communication protocols and parameters. The transceiver equipment similar demodulates and possibly decodes and decrypts, if necessary, any communication signals received from the wireless communications device 102 transmitting within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and wireless communications device 102. An RF channel is a limited resource that must be conserved, typically due limits in overall bandwidth and a limited battery power of the wireless device 102. Those skilled in the art will appreciate that a wireless network in actual practice may include hundreds of cells, each served by a station 118, depending upon desired overall expanse of network coverage. All pertinent components may be connected by multiple switches and routers (not shown), controlled by multiple network controllers.

For all wireless communications devices 102 registered with a network operator, permanent data (such as the user profile associated with each device) as well as temporary data (such as the current location of the device) are stored in the HLR 132. In case of a voice call to the wireless device 102, the HLR 132 is queried to determine the current location of the device 102. A Visitor Location Register (VLR) of MSC 122 is responsible for a group of location areas and stores the data of those wireless devices that are currently in its area of responsibility. This includes parts of the permanent data that have been transmitted from HLR 132 to the VLR for faster access. However, the VLR of MSC 122 may also assign and store local data, such as temporary identifications. Optionally, the VLR of MSC 122 can be enhanced for more efficient coordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of wireless devices 102. SGSN 126 also performs security functions and access control. Gateway GPRS Support Node (GGSN) 128 provides internetworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by wireless device 102 or by the transceiver equipment instructing the wireless device to select a particular cell. The wireless device 102 informs wireless network 104 when it reselects another cell or group of cells, known as a routing area.

In order to access GPRS services, the wireless device 102 first makes its presence known to wireless network 104 by performing what is known as a GPRS "attach". This operation establishes a logical link between the wireless device 102 and SGSN 126 and makes the wireless device 102 available to receive, for example, pages via SGSN, notifications of incoming GPRS data, or SMS messages over GPRS. In order to send and receive GPRS data, the wireless device 102 assists in activating the packet data address that it wants to use. This operation makes the wireless device 102 known to GGSN 128; internetworking with external data networks can thereafter commence. User data may be transferred transparently between the wireless device 102 and the external data networks using, for example, encapsulation and tunneling. Data packets are equipped with GPRS-specific protocol information and transferred between wireless device 102 and GGSN 128.

Those skilled in the art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
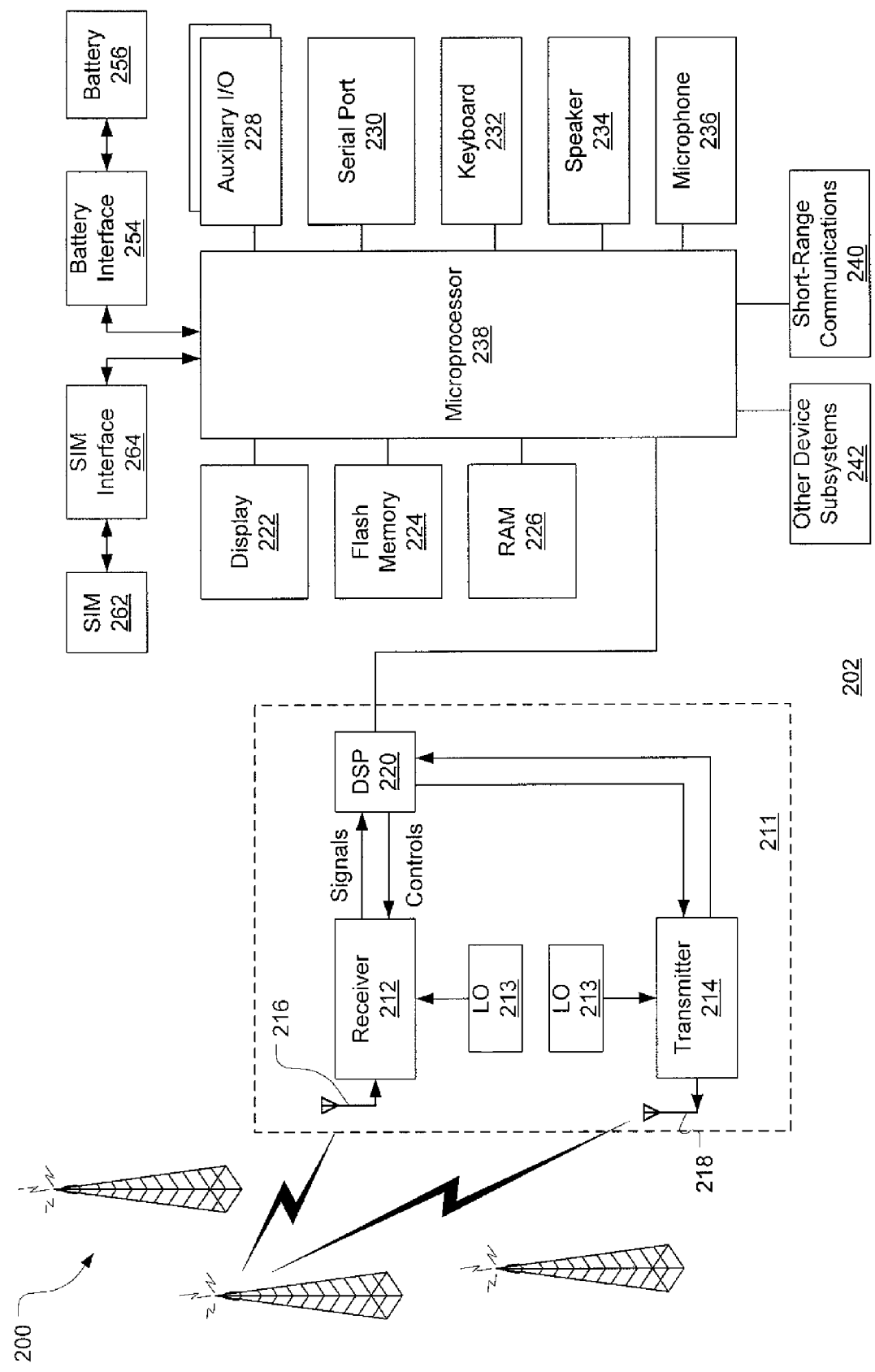
FIG. 2 is a more detailed block diagram of a wireless communications device.

FIG. 2 is a detailed block diagram of a preferred wireless communications device 202. The wireless device 202 is preferably a two-way communication device having at least voice and advanced data communication capabilities, including the capability to communicate with other computer systems. Depending on the functionality provided by the wireless device 202, it may be referred to as a data messaging device, a two-way pager, a cellular telephone with data message capabilities, a wireless Internet appliance, or a data communications device (with or without telephony capabilities). The wireless device 202 may communicate with any one of a plurality of fixed transceiver stations 200 within its geographic coverage area.

The wireless communications device 202 will normally incorporate a communication subsystem 211, which includes a receiver 212, a transmitter 214, and associated components, such as one or more (preferably embedded or internal) antenna elements 216 and 218, local oscillators (LO's) 213, and a processing module such as a digital signal processor (DSP) 220. Communication subsystem 211 is analogous to RF transceiver circuitry 108 and antenna 110 shown in FIG. 1. As will be apparent to those skilled in the field of communications, the particular design of communication subsystem 211 depends on the communication network in which the wireless device 202 is intended to operate.

The wireless device 202 may send and receive communication signals over the network after required network registration or activation procedures have been completed. Signals received by antenna 216 through the network are input to receiver 212, which may perform common receiver functions as signal amplification, frequency down conversion, filtering, channel selection, and the like, and, as shown in the example of FIG. 2, analog-to-digital (A/D) conversion. A/D conversion of a received signal allows more complex communication functions such as demodulation and decoding to performed in the DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in the DSP 220.

Network access is associated with a subscriber or user of the wireless device 202, and therefore the wireless device requires a Subscriber Identity Module or SIM card 262 to be inserted in a SIM interface 264 in order to operate in the network. SIM 262 includes those features described in relation to FIG. 1. Wireless device 202 is a battery-powered device so it also includes a battery interface 254 for receiving one or more rechargeable batteries 256. Such a battery 256 provides electrical power to most if not all electrical circuitry in the device 102, and battery interface provides for a mechanical and electrical connection for it. The battery interface 254 is coupled to a regulator (not shown) which provides a regulated voltage V to all of the circuitry.

Wireless communications device 202 includes a microprocessor 238 (which is one implementation of controller 106 of FIG. 1) which controls overall operation of wireless device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-board functions. Notably, some subsystems, such as keyboard 232 and display 222, for example, may be used for both communication-related functions, such as entering a text message for transmission over a communication network, and device-resident functions such as a calculator or task list. Operating system software used by the microprocessor 238 is preferably stored in a persistent (non-volatile) store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on the wireless device 202. A predetermined set of applications which control basic device operations, including at least data and voice communication applications, will normally be installed on the device 202 during its manufacture. For example, the device may be pre-loaded with a personal information manager (PIM) having the ability to organize and manage data items relating to the user's profile, such as e-mail, calendar events, voice mails, appointments, and task items. Naturally, one or more memory stores are available on the device 202 and SIM 256 to facilitate storage of PIM data items and other information.

The PIM application preferably has the ability to send and receive data items via the wireless network. PIM data items may be seamlessly integrated, synchronized, and updated via the wireless network, with the wireless device user's corresponding data items stored and/or associated with a host computer system thereby creating a mirrored host computer on the wireless device 202 with respect to such items. This is especially advantageous where the host computer system is the wireless device user's office computer system. Additional applications may also be loaded into the memory store(s) of the wireless communications device 202 through the wireless network, the auxiliary I/O subsystem 228, the serial port 230, short-range communications subsystem 240, or any other suitable subsystem 242, and installed by a user in RAM 226 or preferably a non-volatile store (not shown) for execution by the microprocessor 238. Such flexibility in application installation increases the functionality of the wireless device 202 and may provide enhanced onboard functions, communication-related functions or both. For example, secure communication applications may enable electronic commerce functions and other such financial transactions to be performed using the wireless device 202.

In a data communication mode, a received signal such as a text message, an e-mail message, or a web page download will be processed by communication subsystem 211 and input to microprocessor 238. Microprocessor 238 will preferably further process the signal for output to display 222 or alternatively to auxiliary I/O device 228. A user of the wireless device 202 may also compose data items, such as email messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of the wireless communications device 202 is substantially similar, except that the received signals would be output to speaker 234 and signals for transmission would be generated by microphone 236. Alternative voice or audio I/O subsystems, such as a voice message recording subsystem, may also be implemented on the wireless device 202. Although voice or audio signal output is preferably accomplished primarily through speaker 234, display 222 may also be used to provide an indication of the identity of the calling party, duration on a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of wireless device 202 by providing for information or software downloads to the wireless device 202 other than through the wireless network. The alternate download path may, for example, be used to load an encryption key onto the wireless device 202 through a direct and thus reliable and trusted connection to thereby provide secure device communications.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a trademark of Bluetooth SIG, Inc.

Figure 3A:
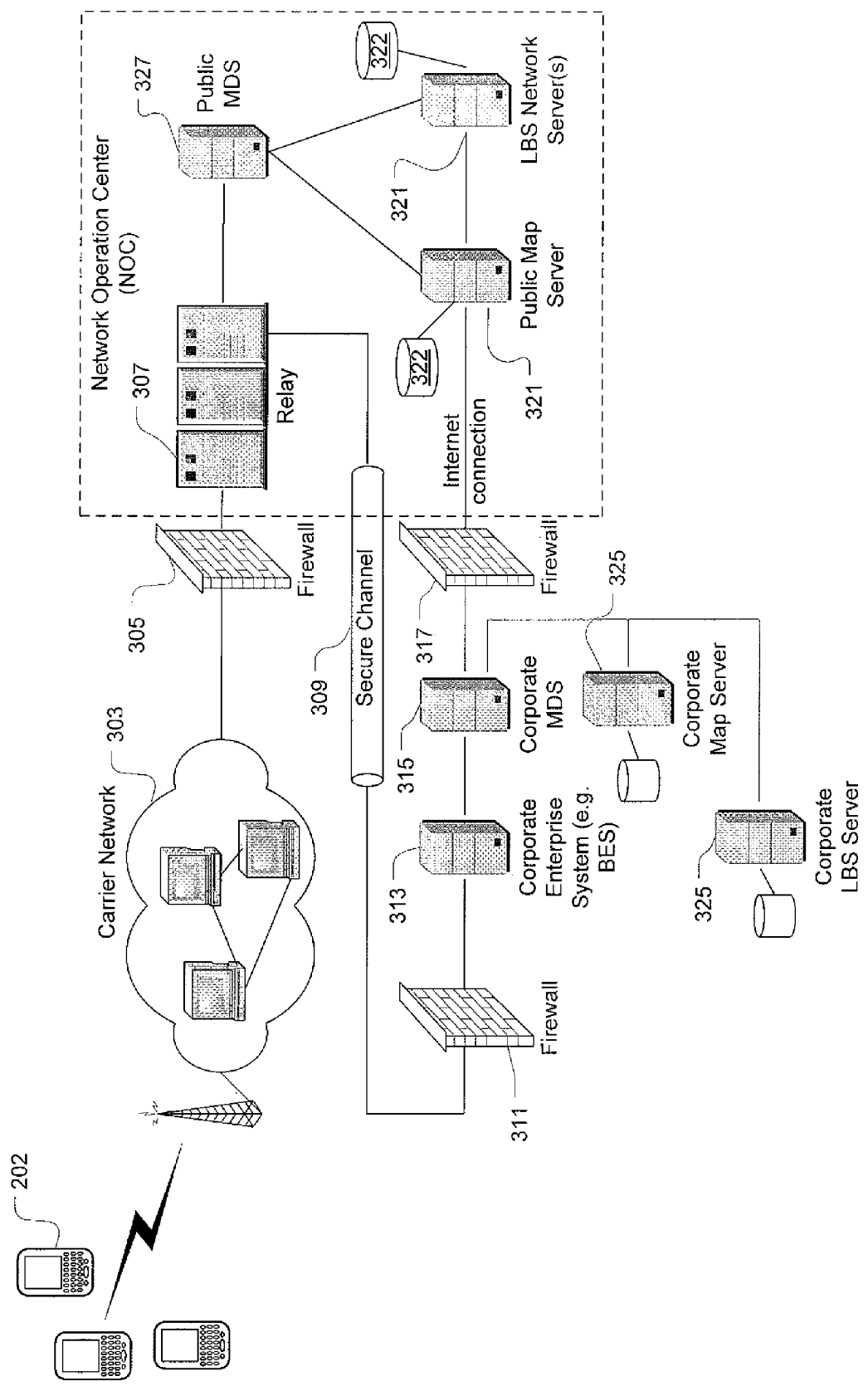
FIG. 3A is a system diagram of network components which provide mapping functionality in the wireless communications devices of FIG. 1 and FIG. 2.

FIG. 3A is a system diagram of network components which provide mapping functionality in the wireless communication devices of FIGS. 1 and 2. To achieve this, a mapping application is also provided in memory of the wireless communications device for rendering visual maps in its display. Wireless communications devices 202 are connected over a mobile carrier network 303 for communication through a firewall 305 to a relay 307. A request for map data from any one of the wireless communications devices 202 is received at relay 307 and passed via a secure channel 309 through firewall 311 to a corporate enterprise server 313 and corporate mobile data system (MDS) server 315. The request is then passed via firewall 317 to a public map server and/or to a public location-based service (LBS) server 321 which provides location-based services (LBS) to handle the request. The network may include a plurality of such map servers and/or LBS servers where requests are distributed and processed through a load distributing server. The map/LBS data may be stored on this network server 321 in a network database 322, or may be stored on a separate map server and/or LBS server (not shown). Private corporate data stored on corporate map/LBS server 325 may be added to the public data via corporate MDS server 315 on the secure return path to the wireless device 202. Alternatively, where no corporate servers are provided, the request from the wireless device 202 may be passed via relay 307 to a public MDS server 327, which sends the request to the public map/LBS server 321 providing map data or other local-based service in response to the request. For greater clarity, it should be understood that the wireless devices can obtain map data from a "pure" map server offering no location-based services, from an LBS server offering location-based services in addition to map content, or from a combination of servers offering map content and LBS.

A Maplet data structure is provided that contains all of the graphic and labelled content associated with a geographic area (e.g. map features such as restaurants (point features), streets (line features) or lakes (polygon features)). Maplets are structured in Layers of Data Entries ("DEntries") identified by a "Layer ID" to enable data from different sources to be deployed to the device and meshed for proper rendering. Each DEntry is representative of one or more artefact or label (or a combination of both) and includes coordinate information (also referred to as a "bounding box" or "bounding area") to identify the area covered by the DEntry and a plurality of data points that together represent the artefact, feature or label. For example, a DEntry may be used to represent a street on a city map (or a plurality of streets), wherein the various points within the DEntry are separated into different parts representing various portions of the artefact or map feature (e.g. portions of the street). A wireless device may issue a request for the map server to download only those DEntries that are included within a specified area or bounding box representing an area of interest that can be represented by, for example, a pair of bottom left, top right coordinates.

Figure 3B:
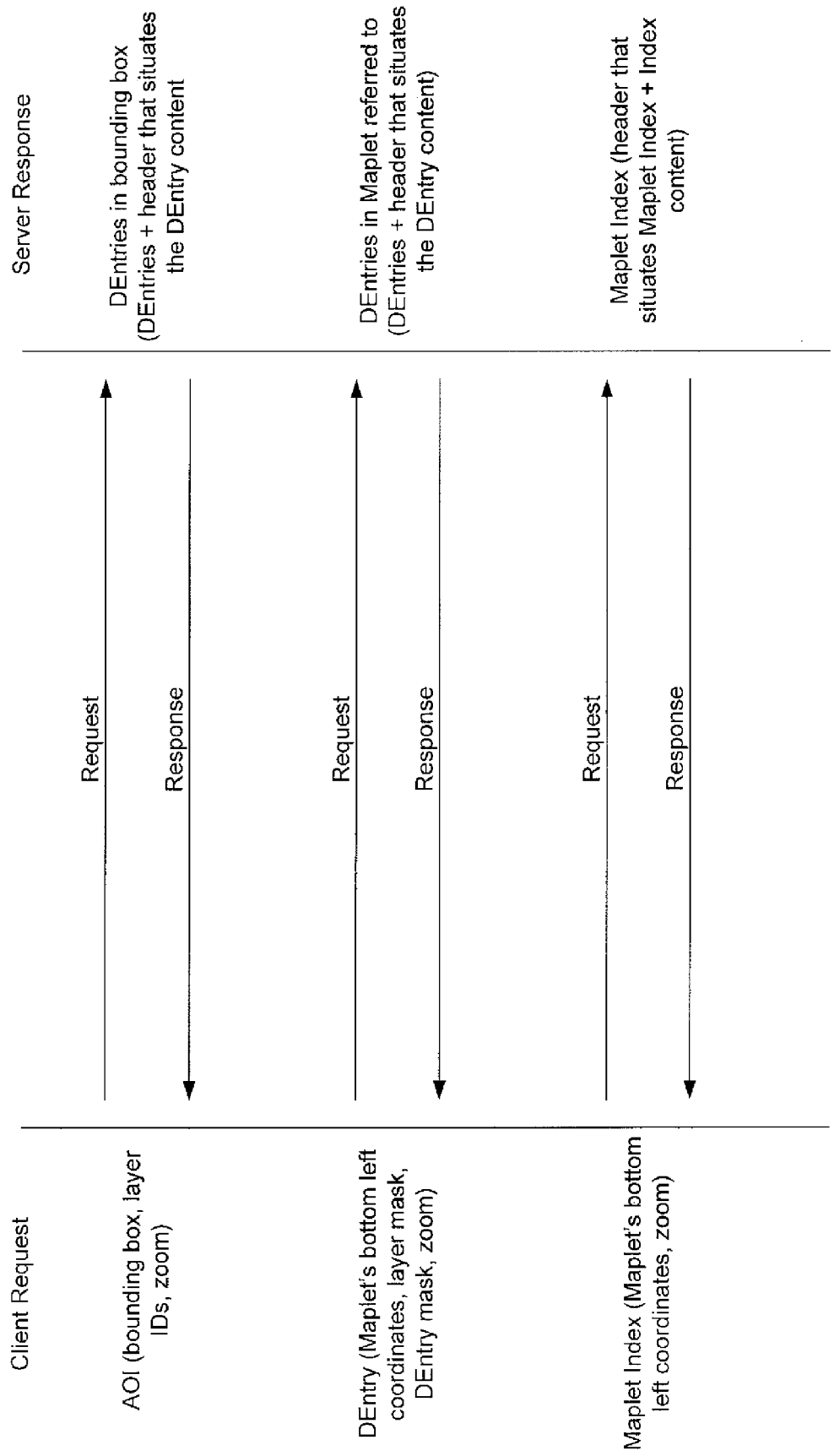
FIG. 3B illustrates a message exchange between a wireless communications device and a map server for downloading map content to the wireless communications device based on the system of FIG. 3A.

As depicted in FIG. 3B, the wireless communications device issues one or more AOI (Area of Interest) requests, DEntry or data requests and Maplet Index requests to the map server for selective downloading of map data based on user context. Thus, rather than transmitting the entire map data for an area in reply to each request from the device (which burdens the wireless link), local caching may be used in conjunction with context filtering of map data on the server. For example, if a user's wireless device is GPS-enabled and the user is traveling in an automobile at 120 km/h along a freeway then context filtering can by employed to prevent downloading of map data relating to passing side streets. Or, if the user is traveling in an airplane at 30,000 feet, then context filtering can be employed to prevent downloading of map data for any streets whatsoever. Also, a user's context can be defined, for example, in terms of occupation, e.g. a user whose occupation is a transport truck driver can employ context filtering to prevent downloading of map data for side streets on which the user's truck is incapable of traveling, or a user whose occupation is to replenish supplied of soft drink dispensing machines can employ context filtering to download public map data showing the user's geographical area of responsibility with irrelevant features such as lakes and parks filtered out and private map data containing the location of soft drink dispensing machines superimposed on the public map data.

The Maplet Index request results in a Maplet Index (i.e. only a portion of the Maplet that provides a table of contents of the map data available within the Maplet rather than the entire Maplet) being downloaded from the map server to the device, thereby conserving OTA (Over-the-Air) bandwidth and device memory caching requirements. The Maplet Index conforms to the same data structure as a Maplet, but omits the data points. Consequently, the Maplet Index is small (e.g. 300-400 bytes) relative to the size of a fully populated Maplet or a conventional bit map, and includes DEntry bounding boxes and attributes (size, complexity, etc.) for all artefacts within the Maplet. As the field of view changes (e.g. for a location-aware device that displays a map while moving), the device (client) software assesses whether or not it needs to download additional data from the server. Thus, if the size attribute or complexity attribute of an artefact that has started to move into the field of view of the device (but is not yet being displayed) is not relevant to the viewer's current context, then the device can choose not to display that portion of the artifact. On the other hand, if the portion of the artefact is appropriate for display, then the device accesses its cache to determine whether the DEntries associated with that portion of the artefact have already been downloaded, in which case the cached content is displayed. Otherwise, the device issues a request for the map server to download all the of the DEntries associated with the artifact portion.

By organizing the Maplet data structure in Layers, it is possible to seamlessly combine and display information obtained from public and private databases. For example, it is possible for the device to display an office building at a certain address on a street (e.g. a $1^{st}$ z-order attribute from public database), adjacent a river (e.g. a $2^{nd}$ z-order attribute from public database), with a superimposed floor plane of the building to show individual offices (e.g. $11^{th}$ z-order attribute from a private database, accessible through a firewall).

Referring back to FIG. 3A, within the network having map server(s) and/or LBS server(s) 321 and database(s) 322 accessible to it, all of the map data for the entire world is divided and stored as a grid according to various levels of resolution (zoom), as set forth below in Table A. Thus, a single A-level Maplet represents a 0.05×0.05 degree grid area; a single B-level Maplet represents a 0.5×0.5 degree grid area; a single C-level Maplet represents a 5×5 degree grid area; a single D-level Maplet represents a 50×50 degree grid area; and a single E level Maplet represents the entire world in a single Maplet. It is understood that Table A is only an example of a particular Maplet grid division; different grid divisions having finer or coarser granularity may, of courser, be substituted. A Maplet includes a set of layers, with each layer containing a set of DEntries, and each DEntry containing a set of data points.

TABLE A

| Level | Grid (degrees) | # of Maplets to cover the World | # of Maplets to cover North America | # of Maplets to cover Europe |
| --- | --- | --- | --- | --- |
| A | 0.05 × 0.05 | 25,920,000 | 356,000 | 100,000 |
| B | 0.5 × 0.5 | 259,200 | 6,500 | 1000 |
| C | 5 × 5 | 2,592 | 96 | 10 |
| D | 50 × 50 | 32 | 5 | 5 |
| E | World | 1 | 1 | 1 |

As mentioned above, three specific types of requests may be generated by a wireless communications device (i.e. the client)—AOI requests, DEntry requests and Maplet Index requests. The requests may be generated separately or in various combinations, as discussed in greater detail below. An AOI (area of interest) request calls for all DEntries in a given area (bounding box) for a predetermined or selected set of z-order Layers. The AOI request is usually generated when the device moves to a new area so as to fetch DEntries for display before the device client knows what is available in the Maplet. The Maplet Index has the exact same structure as a Maplet but does not contain complete DEntries (i.e. the data Points actually representing artifacts and labels are omitted). Thus, a Maplet Index defines what Layers and DEntries are available for a given Maplet. A data or DEntry request is a mechanism to bundle together all of the required Dentries for a given Maplet.

Typically, AOI and Maplet Index requests are paired together in the same message, although they need not be, while DEntry requests are generated most often. For example, when a wireless device moves into an area for which no information has been stored on the device client, the Maplet Index request returns one or more Maplet Indexes for the AOI that indicates what data the client can specifically request from the server 321, while the AOI request returns any DEntries within the area of interest for the specified Layers (if they exist). In the example requests shown on FIG. 3B, the desired Maplet is identified within a DEntry request by specifying the bottom-left Maplet coordinate. In addition, the DEntry request may include a layer mask so that unwanted Layers are not downloaded, a DEntry mask so that unwanted data Points are not downloaded, and zoom values to specify a zoom level for the requested DEntry. Once the device client has received the requested Maplet Index, the client typically then issues multiple DEntry requests to ask for specific DEntries (since the client knows all of the specific DEntries that are available based on the Maplet Index).

In this particular implementation, a collection of 20×20 A-level Maplets (representing a 1×1 degree square) is compiled into a Maplet Block File (.mbl). An .mbl file contains a header which specifies the offset and length of each Maplet in the .mbl file. The same 20×20 collection of Maplet index data is compiled into a Maplet Index file (.mbx). The .mbl and .mbx file structures are set forth in Tables B and C, respectively.

TABLE B

| Address Offset | Offset | Length |
| --- | --- | --- |
| 0x000 | Maplet #0 Offset (4 bytes) | Maplet #0 Length (4 bytes) |
| 0x008 | Maplet #1 Offset | Maplet #1 Length |
| 0x010 | Maplet #2 Offset | Maplet #2 Length |
| ... | ... | ... |
| 0xC78 | Maplet #399 Offset | Maplet #399 Length |
| 0xC80 | Beginning of Maplet #0 | |
| 0xC80 + Size of Maplet #0 | Beginning of Maplet #1 | |
| 0xC80 + Size of Maplet #0 + #1 | Beginning of Maplet #2 | |
| ... | ... | |
| 0xC80 + Σ of Size of Maplets (#0:#398) | Beginning of Maplet #399 | |

In Table B, the offset of Maplet #0 is 0x0000_0000 since, in this particular example, the data structure is based on the assumption that the base address for the actual Maplet data is 0x0000_0C80. Therefore the absolute address for Maplet #0 data is: Maplet #0 Address=Base Address (0x0000_0C80)+

Maplet #0 Offset (0x0000_0000), and additional Maplet addresses are calculated as: Maplet #(n+1) Offset=Maplet #(n) Offset+Maplet #(n) Length. If a Maplet has no data or does not exist, the length parameter is set to zero (0x0000_0000).

TABLE C

| Address Offset | Offset (4 bytes) | Length (4 bytes) |
| --- | --- | --- |
| 0x000 | Maplet Index #0 Offset | Maplet Index #0 Length |
| 0x008 | Maplet Index #1 Offset | Maplet Index #1 Length |
| 0x010 | Maplet Index #2 Offset | Maplet Index #2 Length |
| ... | ... | ... |
| 0xC78 | Maplet Index #399 Offset | Maplet Index #399 Length |
| 0xC80 | Beginning of Maplet Index #0 | |
| 0xC80 + Size of Maplet Index #0 | Beginning of Maplet Index #1 | |
| 0xC80 + Size of Maplet Index #0 + #1 | Beginning of Maplet Index #2 | |
| ... | ... | |
| 0xC80 + Σ of Size of Maplet Indices (#0:#399) | Beginning of Maplet Index #399 | |

In Table C, the offset of Maplet Index #0 is 0x0000_0000 since, according to an exemplary embodiment the data structure is based on the assumption that the base address for the actual Maplet index data is 0x0000_0C80. Therefore, the absolute address for Maplet Index #0 data is: Maplet Index #0 Address=Base Address (0x0000_0C80)+Maplet Index #0 Offset (0x0000_0000), and additional Maplet index addresses are calculated as: Maplet Index #(n+1) Offset=Maplet Index #(n) Offset+Maplet Index #(n) Length. If a Maplet Index has no data or does not exist, the length parameter is set to zero (0x0000_0000).

Figure 3C:
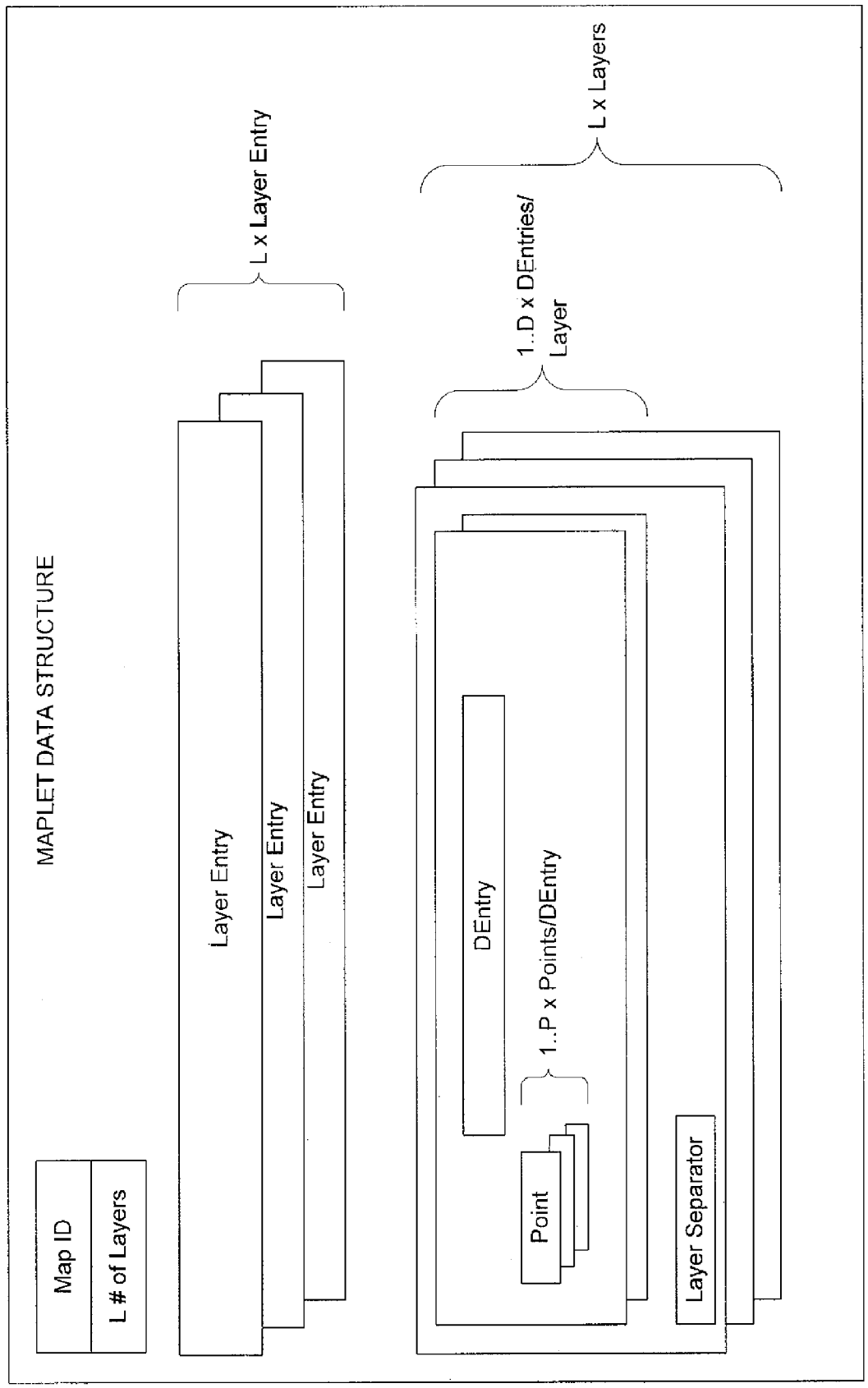
FIG. 3C is a diagram showing a preferred Maplet data structure.

FIG. 3C and Table D (below), in combination, illustrate, by way of example only, a basic Maplet data structure. Generally, as noted above, the Maplet data structure can be said to include a Maplet Index (i.e. an index of the DEntries, each of which is representative of either an artifact or a label or both) together with data Points for each DEntry that actually form such artifacts and labels. In this example, each Maplet includes a Map ID (e.g. 0xA1B1C1D1), the # of Layers in the Maplet, and a Layer Entry for each Layer. The Map ID identifies the data as a valid Maplet, and according to one alternative, may also be used to identify a version number for the data. The # of Layers is an integer which indicates the number of Layers (and therefore Layer Entries) in the Maplet. Each Layer Entry defines rendering attributes and is followed by a list of DEntries for each Layer. The above forms a Maplet Index. For a complete Maplet, each DEntry contains a set of data Points (referred to herein as oPoints) or Labels). It will be noted that Layers can have multiple DEntries and the complete list of DEntries and Points are grouped by Layer and separated by a Layer Separator (e.g. hex value 0xEEEEEEEE). In this example, each Layer Entry is 20 bytes long, and a DEntry is 12 bytes long. However, the number of Layers, number of DEntries per Layer and the number of Points per DEntry depends on the map data and is generally variable.

Table D provides a high "byte-level" description of a Maplet for this example.

TABLE D

| Data | Quantity | Total # of Bytes |
| --- | --- | --- |
| Map ID | 1 | 4 bytes |
| # of Layers | 1 | 4 bytes |
| Layer Entries | # of Layers | 20 bytes × (# of Layers) |
| DEntry of a Layer | × (# of DEntries in a Layer) | # of Layers | 12 bytes × (Σ of the # of DEntries in each Layer) + |
| Points for DEntry of a Layer | | | 4 bytes × (Σ of the # of Points in each DEntry in each Layer) + |
| Layer Separator | | | 4 bytes × (# of Layers) |

Map data can optionally be downloaded first as a Maplet Index enabling the user to then choose which DEntries listed in the Index to download in full. Furthermore, as described earlier, the map application can include user-configurable context filtering that enables the user to filter out unwanted map features or artifacts by not downloading specific DEntries corresponding to those unwanted map features or artifacts.

Figure 4:
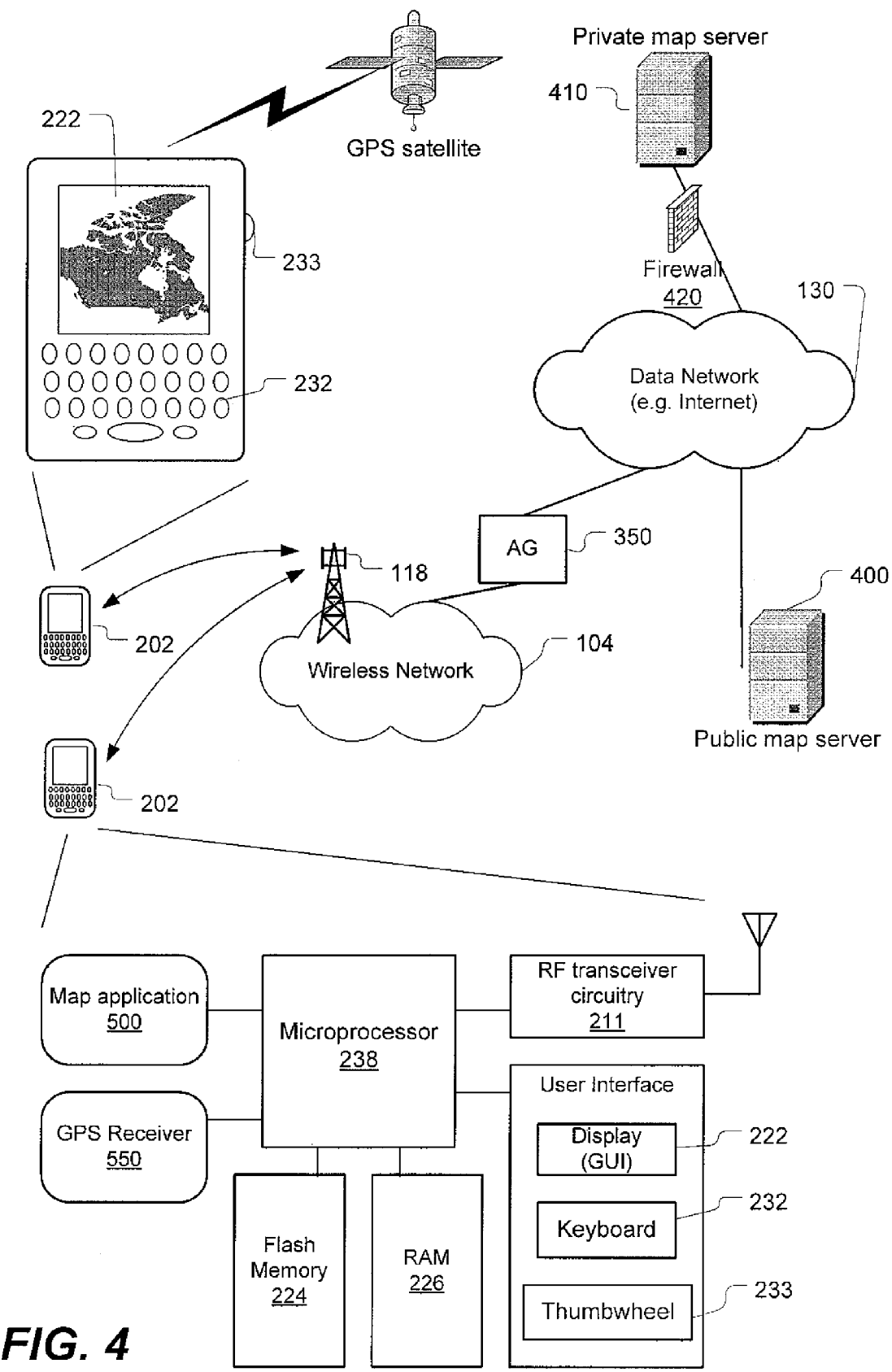
FIG. 4 is a schematic depiction of a wireless network having an applications gateway for optimizing the downloading of map data from map servers to wireless communications devices.

As shown now in FIG. 4, a wireless communications device (such as device 202) may optionally have a Global Positioning System (GPS) receiver 550 (i.e. an embedded GPS chipset or an externally-connected Bluetooth™ GPS puck) for determining a current position of the device. The device 202 has a processor (e.g. microprocessor 238) operatively coupled to memory (e.g. Flash Memory 224 and/or RAM 226) for executing an application, such as a map or navigation application 500 configured to render a map on a display (e.g. GUI 222) of the device, e.g. to show the current position of the device on the map.

As further depicted in FIG. 4, the handheld wireless communications device 202 has a radiofrequency transceiver (e.g. RF transceiver circuitry 211) for wirelessly exchanging data with data sources on the Internet (data network 130). The wireless device 202 communicates via the wireless network 104 using protocols and techniques known in the art. Mediating between the wireless network 104 and the data network (Internet) 130 is (optionally) an applications gateway (AG) 350 which performs various encodings, mappings, compressions and optimizations on the data in order to facilitate data transmission between the wireless devices 202 and online data sources (e.g. public and private map servers 400, 410) connected to the Internet 130. The map server extracts generic map content from a Geographical Information Systems (GIS) map database (e.g. Navtech®, TelAtlas®, etc.) at a specified level of resolution ("zoom level"). Custom graphics associated with the query, such as highlighted route, pushpin for current position or street address, etc. are post-processed and merged by the server with the generic map content. Relevant screen graphics are then labelled and the merged map graphic is compressed and delivered to the device for display. Alternatively, labelling can be done client-side using a computationally efficient labelling algorithm.

The wireless communications device 202 can thus download and display map, route and current position information on the device's display or GUI 222, e.g. a touchscreen display. As will be elaborated below, the map information (or any other type of information for that matter) can be selectively magnified onscreen to facilitate viewing of any particular portion of the onscreen information.

For example, in one implementation which will be elaborated below, it may be useful to magnify the area surrounding the current position where the current position is shown on a map for real-time navigation. To determine its current position, the wireless communications device 202 would include a Global Positioning System (GPS) receiver (e.g. GPS chip 550 shown in FIG. 4). The GPS chipset may implement Aided GPS or Assisted GPS technologies to improve acquisition times. Optionally, radio-location or triangulation techniques can be applied to attempt to improve the accuracy of the GPS position fix. Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multinational Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

As further depicted in FIG. 4, a processor (e.g. microprocessor 238 shown in FIG. 4) is operatively coupled to memory (e.g. Flash Memory 224 and RAM 226 shown in FIG. 4) for executing for executing an application (e.g. a map application) configured to present information on the display screen, e.g. touch-sensitive display, of the device and for controlling actuation of the one or more shape-changing zones of the touch-sensitive display screen. In one example, the application is a map/navigation application (and the information displayed onscreen is a map showing current position of the device). GPS position data is received from the GPS chipset 550. Based on the current position, as determined by the GPS receiver 550, the map/navigation application 500 sends a request to download new or updated map data from a map server (assuming the map data in the local cache is insufficient). The request (either an AOI request or a DEntry request, in the exemplary case of Maplets as described above) specifies an area of interest (AOI) having a bounding box that is centered around the GPS-determined coordinates or, alternatively, specific DEntries. When the map data is received at the device, a map showing the current position of the device is rendered for display onscreen. The current position can then be magnified by actuating the shape-changing zones of the shape-changing display at the current position so that a magnifying lens is formed above the current position icon and the immediately surrounding area.

In operation, a user of the wireless communications device 202 uses an input device such as keyboard 232 and/or thumbwheel/trackball 233 to cause the microprocessor 238 to open the map (or navigation) application 500 stored in the memory 224. Alternatively, the map application can be launched by another application, such as a location-based services (LBS) application. The input device could also be integrated into the LCD display screen in the form a touchscreen device. Using the keyboard 232 and thumbwheel/trackball 233, the user can launch the map/navigation application 500. In response to this request/command, the microprocessor 238 instructs the RF transceiver circuitry 211 to transmit the request over the air through the wireless network 104. The request is processed by the AG 350 and forwarded into the data network (Internet) using standard packet-forwarding protocols to one or more of the public and/or private map servers 400, 410. Accessing a private map server 410 behind a corporate firewall 420 was described above with reference to FIG. 3A. Map data downloaded from these one or more map servers 400, 410 is then forwarded in data packets through the data network and encoded/transformed/optimized by the AG 350 for wireless transmission through the wireless network 104 to the wireless communications device 202 that originally sent the request.

The downloaded map data (including any available label data) can be cached locally in RAM 226, and displayed on the display 222 or graphical user interface (GUI) of the device. If a further request is made by the user (or if the user wants a change in the field of view by zooming or panning), the device will check whether the data required can be obtained from the local cache (RAM 226). If not, the device issues a new request to the one or more map servers 400, 410 in the same manner as described above.

Figure 5:
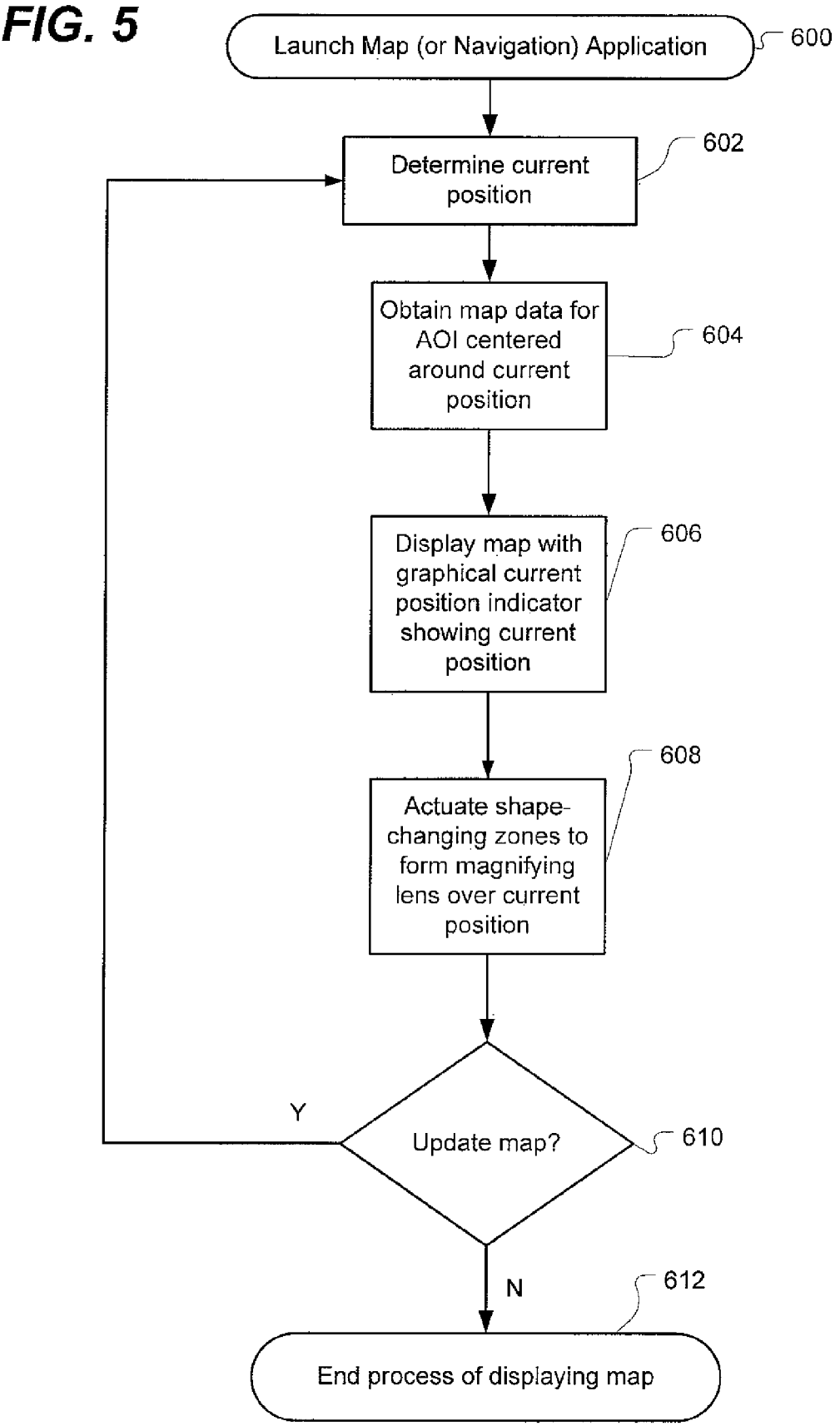
FIG. 5 is a flowchart presenting steps of a method of magnifying (or "zooming in" on) map information displayed on a touchscreen in accordance with implementations of the present technology.

Operation of the present technology introduced above will now be described with reference to the method steps depicted in the flowchart of FIG. 5. As depicted in FIG. 5, this novel method of selectively magnifying onscreen information (such as map information) displayed on a touchscreen (or other type of display) of a handheld electronic device (such as a wireless communications device) includes an initial step 600 of launching an information-presenting application, e.g. a mapping application. This can be done directly by the user of the device, indirectly by means of another application, e.g. an LBS application that causes the map application to open, or "automatically" by putting the device into "navigation mode".

At step 602, the device can then obtain a current position of the device. This can be done using the onboard GPS chip. Map data is then downloaded for the area of interest around the current position (step 604). A map is then rendered for display onscreen (step 606), optionally with a graphical current position indicator (icon, symbol, crosshairs, etc.) representing the current position on the map. At step 608, the shape-changing zone or zones above the current position are actuated to form a magnifying lens over the current position, thus visually magnifying the current position and the immediately surrounding area. This can be useful when navigating because details in the immediate vicinity of the current position are more easily readable while nevertheless retaining the peripheral information onscreen that is helpful in maintaining a sense of overall context. At step 610, a decision is made as to whether to update the map. If the device is operating in navigation mode, then the map will be continually updated as the device moves into new territory. Of course, if the device backtracks then recently downloaded map data can be retrieved from a local cache. At step 612, operations cease if no further map data is required.

Figure 6:
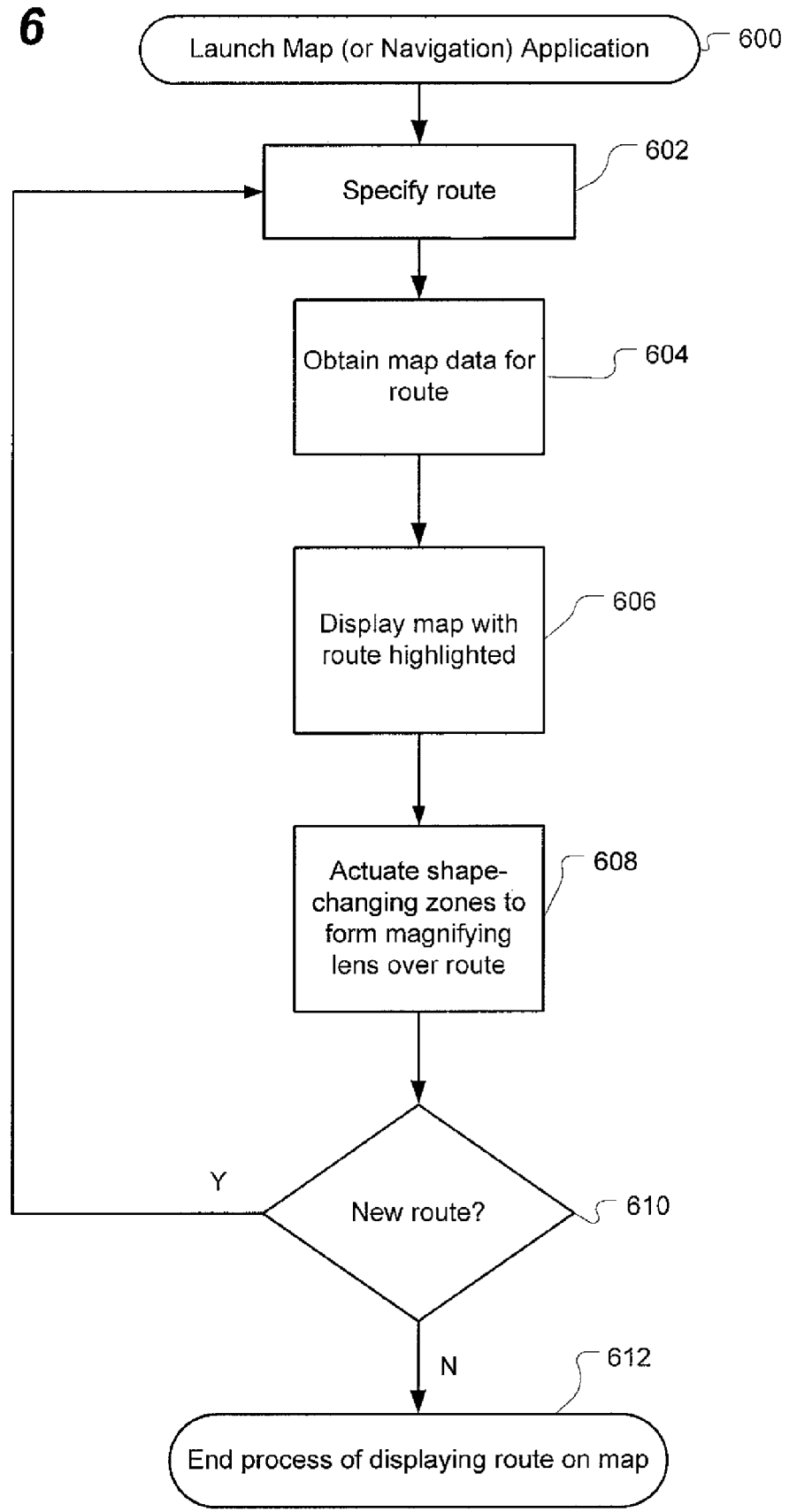
FIG. 6 is another flowchart presenting steps of a method of magnifying a map route displayed on a touchscreen in accordance with implementations of the present technology.

FIG. 6 shows another flowchart depicting steps of magnifying a route on a map. In this case, as will be elaborated below, the route from a starting location to a destination location is magnified to facilitate viewing of map features or details along the route. As will be described and illustrated further on, this can be done is two ways: first, by magnifying the entire route at once or, second, by using a movable lens that is displaced along the route from the starting point to the destination point. As is apparent from a comparison of FIGS. 5 and 6, the steps are in general the same. However, in FIG. 6, the step 602 requires specification of a route. Step 604 entails obtaining not only map data but the route as well. Step 606 entails not only displaying the map but also the particular route. Often this is done by highlighting the sequential path segments defining the route. Step 608 then involves actuating shape-changing zones to form a magnifying lens over the route, either, as noted above, as a single elongated lens covering the entire route (to the extent visible onscreen) or by employing a moving or sliding lens that displaces at an visually ergonomic pace over the route. The lens can be made to repeat its sweep over the route.

Figure 7:
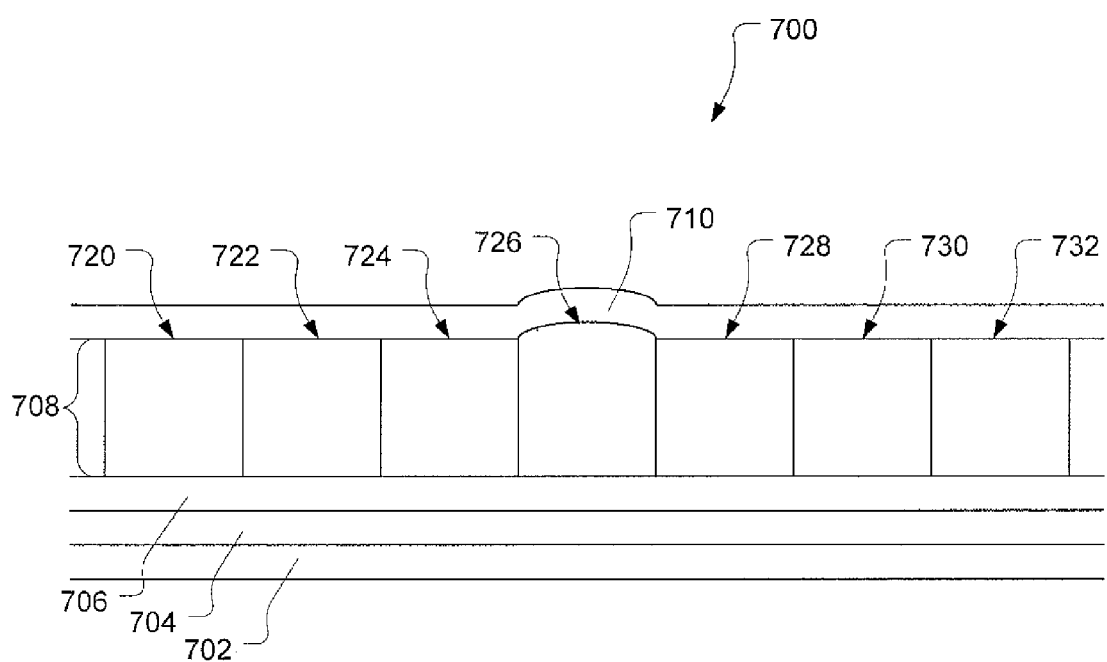
FIG. 7 is a cross-sectional view of an shape-changing touch-sensitive display screen used for creating an adaptive lens in accordance with implementations of the present technology.

FIG. 7 is a cross-sectional view of an exemplary shape-changing touch-sensitive display screen generally designated by reference numeral 700 used for creating an "adaptive lens" in accordance with implementations of the present technology. Although this technology is preferably implemented using a touch-sensitive display, other types of display screens (such as a regular LCD screen, a plasma-type screen or even a CRT-type screen) can be used provided there is a shape-changing layer incorporated or otherwise attached thereto. For screens that are not touch-sensitive, the adaptive lens can be made to follow a cursor, arrow, current position graphical indicator, or any other element or item onscreen. The expressions "adaptive lens" or "magnifying lens" mean a convex bulge formed by activation or actuation of an expandable gel, fluid or gas contained within one or more shape-changing zones or cells in an array of shape-changing zones in a shape-changing layer. By causing one or more zones or cells to bulge into a convex shape, the resulting magnifying lens visually magnifies any information displayed beneath by the LCD layer. The lens is said to be "adaptive" because it can adapt or dynamically react to particular information being displayed onscreen, as will be elaborated below, such as, for example, following an icon or cursor around the screen, tracking the current position of the device, etc.

FIG. 7 illustrates one possible layering of surfaces that form the exemplary display screen 700 of the handheld electronic device. The bottom layer 702 is a layer in which the liquid crystal display (LCD) would be found. The LCD visually presents information in a manner well understood in the art. A capacitive or other touch screen layer 704 is positioned immediately above the LCD layer 702. A number of different touchscreen technologies (e.g. resistive, capacitive, surface acoustic wave, infrared, strain gauge, optical imaging, dispersive signal, acoustic pulse recognition) can be used to produce a touch-sensitive graphical user interface that is capable of simultaneously displaying content to the user while receiving user input from the user's finger(s) or stylus.

The touch-sensitive (e.g. capacitive) layer 704 is used to detect the tactile touchscreen input by the depression of a finger or stylus on the touchscreen. In other words, this capacitive layer 704 is used to detect digital press-engagement or other actuation (e.g. stylus) by the user on the screen. An activation layer 706 is positioned immediately above the capacitive layer 704. The activation layer 706 is used to activate the cells (or "zones") located above in the shape-changing upper surface 708. This shape-changing upper surface 708 can be constructed such that it incorporates a protective cover layer 710. Alternatively, the cover layer 710 may be incorporated within the shape-changing upper surface 708. This cover layer 710 provides an extra layer of protection to the display screen. The shape-changing upper surface 708 alternatively can be described as a shape-adaptive, exposed upper surface whose zones can be actuated to expand into one or more magnifying lenses for visually magnifying information presented by the LCD layer. In a preferred embodiment, the layers above the display layer are composed of a substantially transparent material. When these layers are composed of substantially transparent material, they allow for visualization of images presented on the lower display of the adaptive display screen. Other layouts may also be implemented.

As shown in FIG. 7, the activation layer 706 can be adapted such that only a single size-alterable zone is activated while the remaining size-alterable zones are not. In other words, the activation layer 706 can control a single size-alterable zone without activating the adjacent or neighbouring size-alterable zones. However, in response to the changes of a size-alterable zone, the adjacent size-alterable zones may or may not experience minor changes in shape. These size alterable zones can change shape in response to a control program that adjusts the shape and size of the zones.

The shape-changing upper surface layer 708 can be made of a material ("responsive medium") that changes size in response to a controlled input to the layer 708. The responsive medium in the shape-changing upper surface layer 708 can be a material, such as a liquid or gel, that experiences a density and/or viscosity change, for instance changing from the liquid phase to the solid phase. Alternatively, the liquid can become denser depending upon the electric charge applied to the medium. The medium could also be a gas capable of changing the shape of the pocket in which the gas is held. In one implementation, the size-alterable zones comprise an electrically-responsive medium that changes volume when electrically stimulated. In a particular embodiment, the electrical stimulation is provided through a change in current or voltage being applied to the size-alterable zones. Other forms of stimulation (e.g. magnetic or thermal) that produce a volumetric change in a particular medium are also considered to fall within the scope of this disclosure. Some examples of appropriate volumetrically-changeable media are disclosed in U.S. Pat. Nos. 6,287,485, 7,212,332, 5,739,946, and U.S. Pat. No. 6,894,677. For example, some polyelectrolyte gels (hydrogels) are known to exhibit useful volume-modulation properties (swelling characteristics in the presence of a DC electric field). See, for example, Esmaiel Jabbari et al., "Swelling characteristics of acrylic acid polyelectrolyte hydrogel in a DC electric field" *Smart Mater. Struct.* (2007) Vol. 16, pp. 1614-1620. Use of such gels in a micro-electromechanical system (MEMS) to form a so-called gel network pump is discussed in U.S. Pat. No. 7,212,332 (Chee). Alternatively, in lieu of an array of pockets containing shape-changing fluids or gels, a solid layer of shape-changing material can be used (e.g. a shape-changing polymer or alloy that deforms locally when subjected to locally focused electrical or magnetic stimulation). A variety of smart materials (intelligent gels, ceramics, alloys, and polymers) that could be considered as potential candidates for a solid layer (i.e. the shape-changing upper surface layer 708) are described in *Smart Materials: Emerging Markets for Intelligent Gels, Ceramics, Alloys, and Polymers* published by Technical Insights, Inc. and available online at http://www.the-infoshop.com/study/ti4914 smart *materials.html*.

In one implementation, the size-alterable zones 720, 722, 724, 726, 728, 730, and 732 are configured such that the electrically responsive medium is confined within a pocket of a flexible sheet. The flexible sheet of the upper surface can be provided with pockets or voids that would accommodate an expandable gas or liquid. This would allow the upper surface to be constructed and assembled as a single unit. Depending on the medium encapsulated in the pockets of the flexible sheet and depending on the nature of the electrical stimulation that is applied, the size-alterable zones 720, 722, 724, 726, 728, 730, or 732 could be made to expand in a desired manner to form a convex lens.

As shown in FIG. 7, the activated size-alterable zone 726 is expanded thereby establishing a convex bulge on the shape-changing upper surface layer 708 physically forming a magnifying lens. This expansion is caused through an increase in the volume of the medium in the size-alterable zone 726. This increase in volume of the size-alterable zone 726 can be produced by the activation layer 706, which in at least one implementation is capable of supplying electrical stimulation to the shape-changing upper surface layer 708. Alternatively, a single size-alterable zone 720, 722, 724, 726, 728, 730, or 732 can be stimulated so that a convex lens is formed on the shape-changing upper surface layer 208. The convex bulge serves as a lens to magnify information presented beneath. These convex bulges can be actuated by pressing the touchscreen at a location where a lens is desired, or alternatively, these lenses can be actuated by determining the location onscreen of a specific piece or portion of onscreen information for which magnification is desirable.

Figure 8:
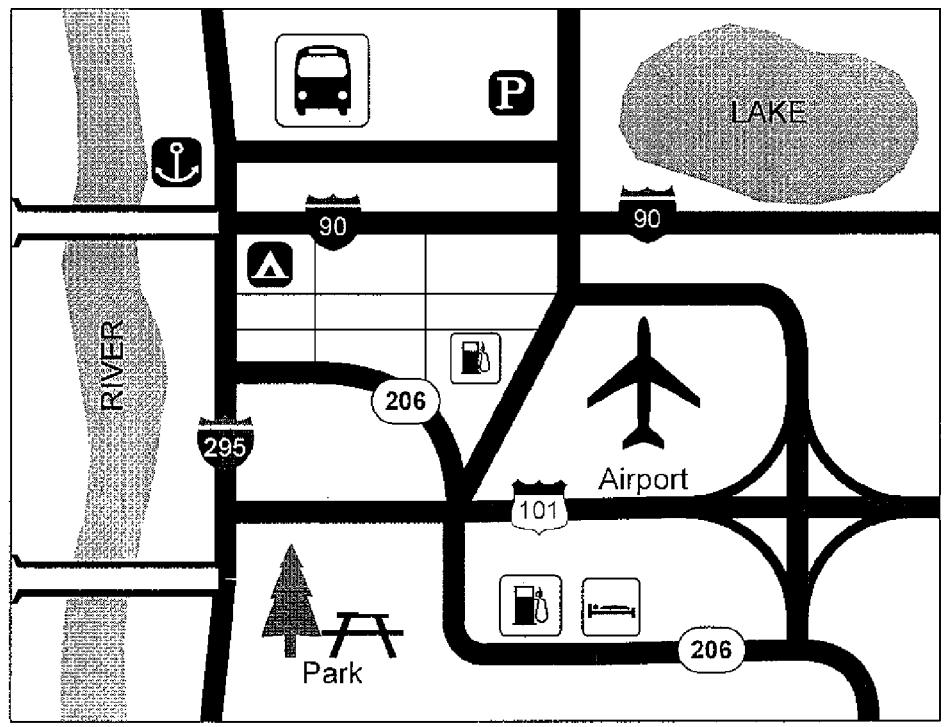
FIG. 8 is an example of a typical map downloaded to, and displayed on, a wireless communications device.

FIG. 8 is an example of a typical map downloaded to, and displayed on, a wireless communications device. Due to the limited size of the display screen, the amount of detail that can be presented in a visually ergonomic manner is limited. In this particular example, while major highways, geographical features (the lake and the river), and major points of interest (POI's) are displayed, the labels associated, for example, with the minor (secondary) roads in the central portion of the map between Interstate 90 and Highway 206 may be displayed in a small, unreadable font.

Figure 9:
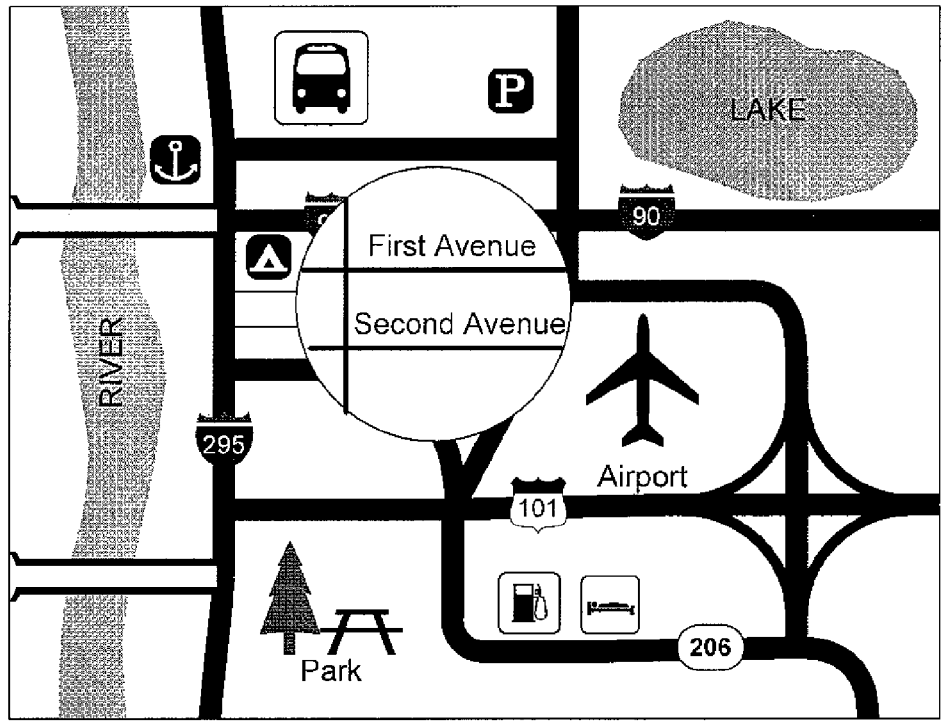
FIG. 9 schematically depicts an arbitrarily positioned magnifying lens for visually magnifying a target area on the display in accordance with one implementation of the present technology.

FIG. 9 schematically depicts how an arbitrarily positioned magnifying lens (created by actuating the shape-changing zones to form the lens) can be positioned arbitrarily onscreen to visually magnify a target area on the display. The magnifying lens can be placed at the target location by simply touching the touch-sensitive screen. Touching the screen would cause actuation of one or shape-changing zones/cells to bulge outwardly to form the lens. The radius of the lens can be preconfigured by the user or set automatically as a function of the zoom level and screen size in order to provide a useful amount of enlargement without unduly sacrificing peripheral information.

As depicted in FIG. 9, the actuated lens would thus enlarge map details in the target area, thus revealing details that would otherwise not be readily visible (or which were simply not displayed at that zoom level, as will be explained below). In this example, the labels "First Avenue" and "Second Avenue" are presented in a readable fashion in the circular lens of FIG. 9. As alluded to above, this lens technology can thus be used in two different ways: first, to simply magnify map details that are already presented onscreen for a given zoom level but which are not easily readable because their size is too small or, secondly, to provide an area for visually presenting further detail that is not present on the unmagnified map but which can be obtained by further download of data. In this latter scenario, additional map data is thus downloaded "on the fly" from the map server by accessing other data layers or entries in the map data (e.g. other Maplet layers or data entries in the specific implementation of vector-format map data) using the lens as a "bounding box" or "bounding circle" defining the target area of interest. In other words, the device can fetch one or more additional layers of map data or one or more additional individual entries (e.g., in the case of Maplets, one or more additional layers or DEntries can be downloaded by making an AOI request or a DEntry request). Accordingly, only data for that specific target area needs to be downloaded. The extra map data is then displayed in an enlarged/magnified manner onscreen in a circular lens frame or bubble as shown in FIG. 9. As will be appreciated, the magnifier lens need not be circular, nor must it necessarily have a frame or boundary delimiting its radial reach.

Figure 10:
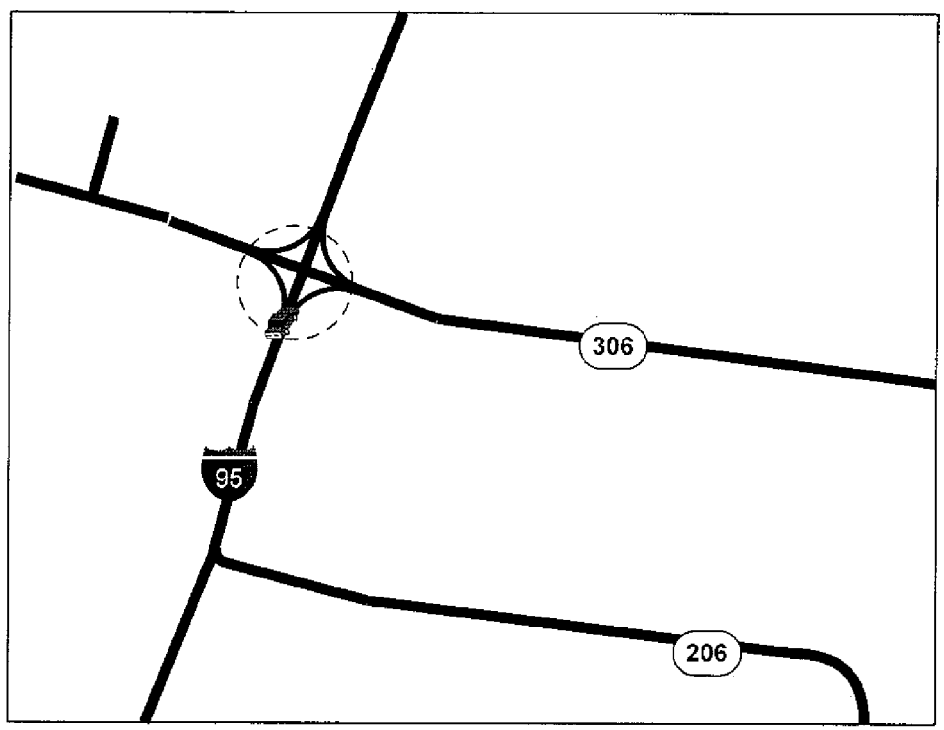
FIG. 10 is an example of a map showing a current position of the wireless device downloaded to, and displayed on, the display screen of the wireless device.

FIG. 10 is an example of a map showing a current position of the wireless device downloaded to, and displayed on, the display screen of the wireless device. In this particular example, a small car icon is used to represent the real-time current position of the device. Of course, other icons (triangle, arrows, crosshairs, etc.) can be used in lieu of the car icon. This car icon is a "graphical current position indicator". The graphical current position indicator is often automatically centered on the map, although, as shown in FIG. 10, this need not be the case. In any event, the car icon is shown approaching a diamond-shaped highway interchange where further map detail might be useful to the driver/navigator. For example, there might be specific signs, points of interest, or unusual exit ramps that are not apparent at the zoom level of the map of FIG. 10. By applying the novel lens technology, the device can be configured to automatically track the current position and to position a magnifying lens over the current position and its immediately surrounding area (with or without a slight forward bias).

Figure 11:
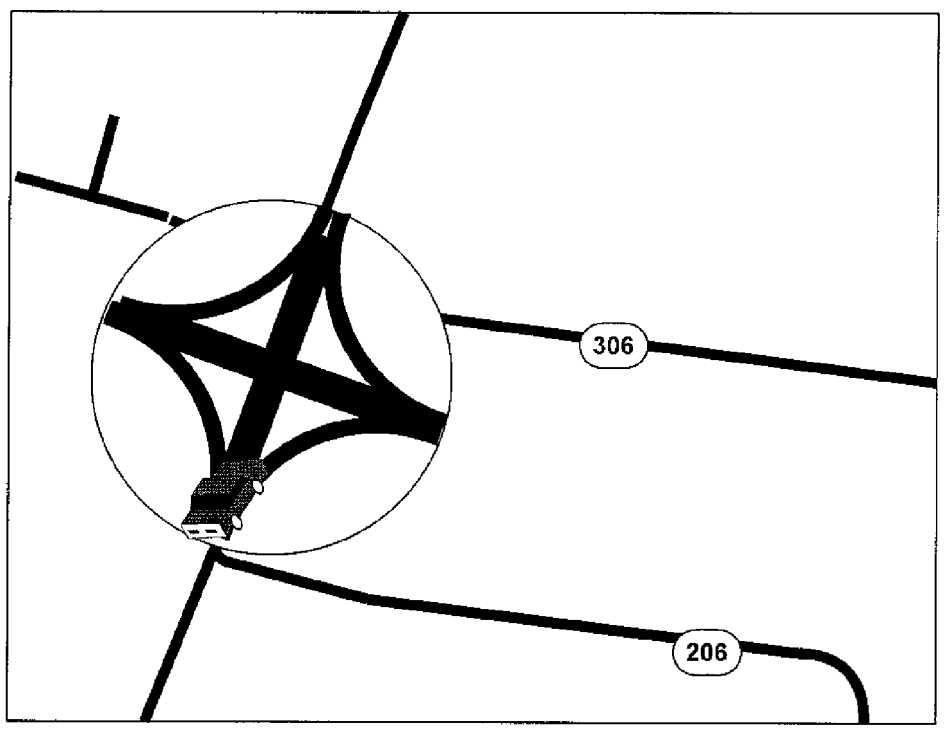
FIG. 11 schematically depicts a magnifying lens formed at the onscreen location representing the current position of the device in accordance with another implementation of the technology.

FIG. 11 schematically depicts the magnifying lens formed at the onscreen location representing the current position of the device (the car icon) in accordance with another implementation of the technology. In this particular example, the lens magnifies the current position of the device (as represented by the car icon) with a substantial forward bias, to show the target area immediately forward of the device. Additional map features would then be more easily seen by the user. The device can be configured to automatically magnify the current position when operating in navigation mode. The device could furthermore be responsive to the user touching the screen at another location to provide a lens at that selected location (either by temporarily replacing the lens over the current position with a new lens over the arbitrarily selected position or by adding the new lens without removing the existing lens).

Figure 12:
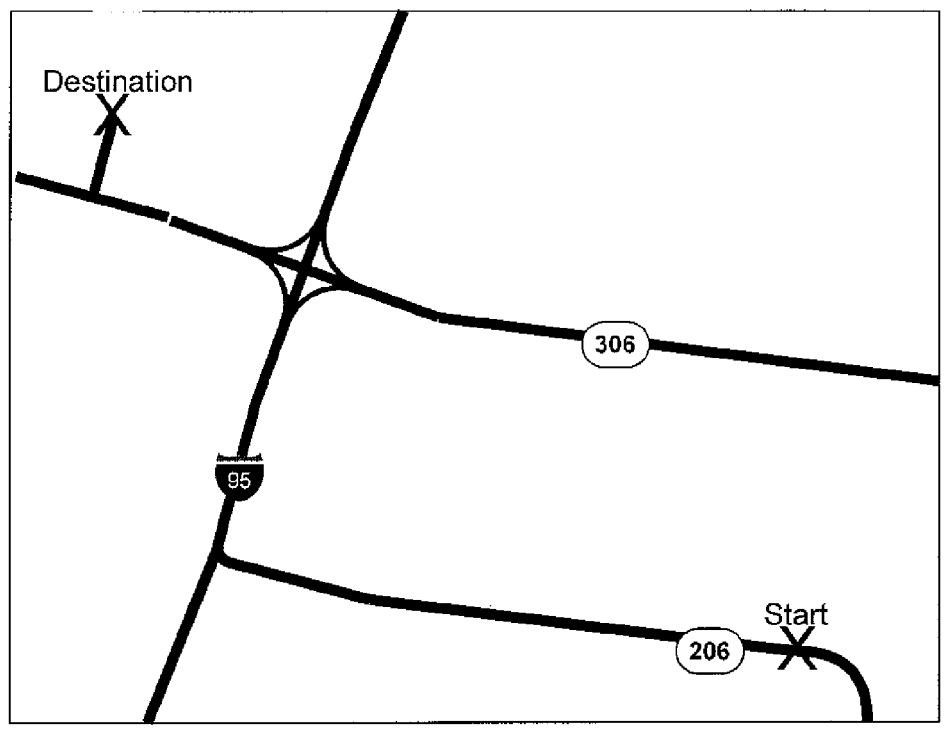
FIG. 12 is an example of a map showing a route from a starting location to a destination location.
Figure 13:
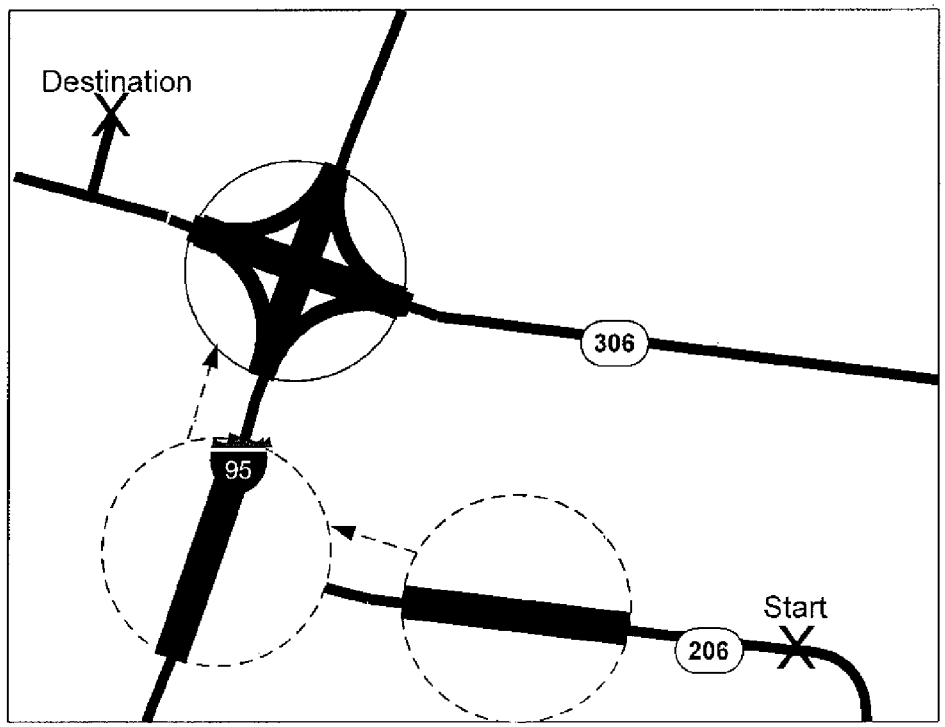
FIG. 13 schematically depicts a moving magnifying lens that propagates along the route in accordance with another implementation of the technology.

FIG. 12 is an example of a map showing a route from a starting location to a destination location. As alluded to previously, this novel local-magnification technology can be used to zoom in on the route, either by magnifying the entire route at once (to be discussed and illustrated below) or by sequentially magnifying the route by displacing the lens over the route at a pace that enables the user to view details and characteristics of the route. The latter scenario is presented in FIG. 13. In other words, FIG. 13 schematically depicts a moving magnifying lens that propagates along the route. The lens is formed or synthesized at the starting location and then slid, moved or displaced along the route to the destination as represented schematically by the multiple circular lenses in FIG. 13. This can be accomplished by dynamically redefining the target area as the target area is displaced over the route from the starting point to the destination point whereby shape-changing zones along the route change shape to visually magnify the route. In that sense, the lens is adaptive because it adapts to the particular route.

Figure 14:
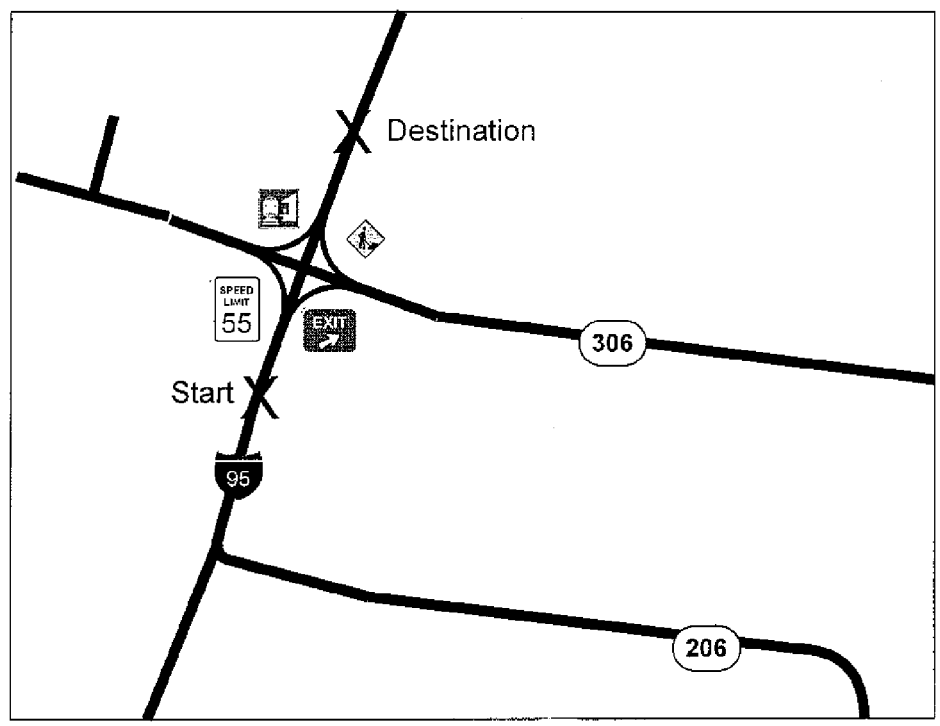
FIG. 14 is another example of a map showing a route from a starting location to a destination location at a zoom level where map details are not easily readable.
Figure 15:
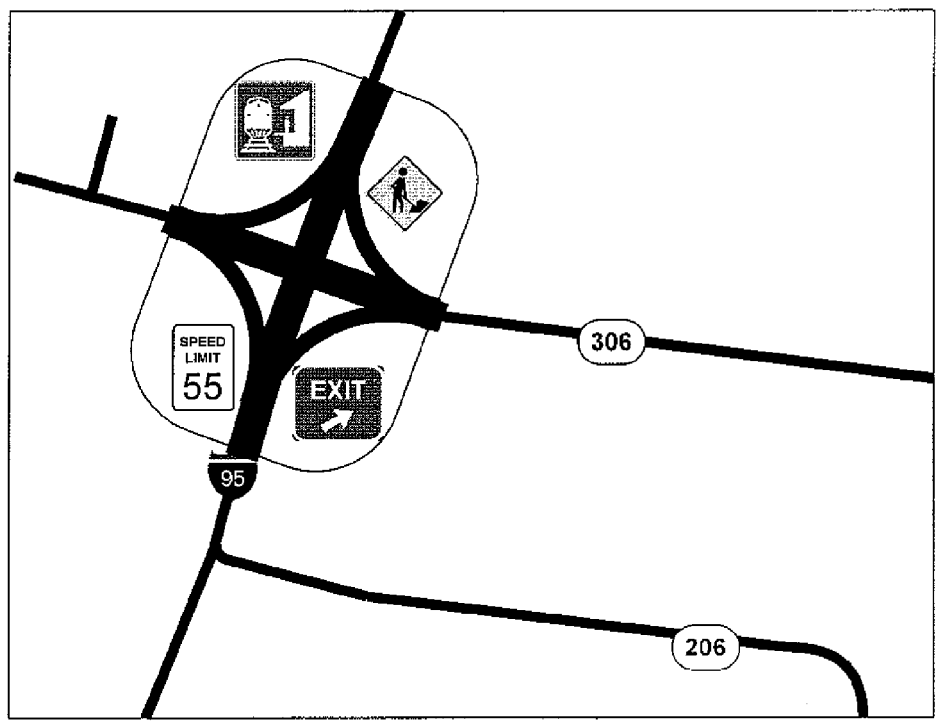
FIG. 15 schematically depicts an oblong magnifying lens formed over the entire route, thus magnifying map details that would ordinarily not be easily readable at that zoom level.

FIG. 14 is another example of a map showing a route from a starting location to a destination location at a zoom level where map details are not easily readable. As shown at the diamond interchange, the map is displaying a number of small icons that are difficult to read. In this case, as shown in FIG. 15, the entire route can be magnified all at once. This is accomplished by statically defining the target area as encompassing the entire onscreen length of the route.

FIG. 15 schematically depicts an oblong magnifying lens formed over the entire route, thus magnifying map details that would ordinarily not be easily readable at that zoom level. In particular, the magnifying lens enlarges a number of icons surrounding the diamond interchange such as the speed limit, an exit sign, a construction warning and a train station icon. By virtue of the local magnification of these icons, the user can readily discern what they are with a quick glance. By only magnifying the portion around the interchange, the map retains peripheral onscreen information such as highways 206 and 306 and Interstate 95. This is helps the user navigate by preserving the user's overall sense of context.

In each of the foregoing examples, the device first detects what sort of information is being presented. For example, if the device detects that it is operating in navigation mode, the lens is formed over the current position indicator. If the device detects that a route has been obtained, then the route is magnified in one of the two manners described above. If the device detects touchscreen input, then the lens can be formed at that touched location onscreen. Of course, as mentioned earlier, the information presented onscreen need not be confined to maps. This lens can be used to magnify a portion of text, graphics, a digital photo, or any other onscreen information.

Although touchscreen devices represent a preferred implementation of this adaptive lens technology, the shape-changing zones (and shape-changing layer) can also be implemented on other types of screens that are not touch-sensitive.

This new technology has been described in terms of specific implementations and configurations (and variants thereof) which are intended to be exemplary only. The scope of the exclusive right sought by the applicant is therefore intended to be limited solely by the appended claims.

The invention claimed is:

1. A method of displaying information on a display of a handheld electronic device, the method comprising steps of:
   determining a target area to be visually magnified; and
   causing a shape-changing zone of the display to physically change shape in the target area to form a lens for visually magnifying information displayed in the target area.

2. The method as claimed in claim 1 wherein the step of determining the target area comprises steps of:
   detecting that the device is operating in navigation mode in which a map of a current position of the device is displayed on the display of the device;
   identifying the current position of the device onscreen; and
   defining the target area to encompass the current position of the device onscreen.

3. The method as claimed in claim 1 wherein the step of determining the target area comprises steps of:
   detecting a route on a map that is displayed on a display of the device;
   identifying a starting point of the route and a destination point of the route;
   defining the target area to encompass the starting point; and
   dynamically redefining the target area as the target area is displaced over the route from the starting point to the destination point.

4. The method as claimed in claim 1 wherein the step of determining the target area comprises steps of:
   detecting a route on a map that is displayed on a display of the device; and
   statically defining the target area as encompassing an entire onscreen length of the route.

5. The method as claimed in claim 1 wherein the step of determining the target area comprises steps of:
   receiving touchscreen input at an onscreen location of the display; and
   defining the target area to encompass the onscreen location.

6. The method as claimed in claim 5 further comprising steps of:
   receiving another touchscreen input at another onscreen location of the display;
   and
   dynamically displacing the target area to encompass the other onscreen location.

7. A computer program product comprising code which, when loaded into memory and executed on a processor of a handheld electronic device, is adapted to display information on a touchscreen display of the handheld electronic device by performing steps of:
   determining a target area to be visually magnified; and
   causing a shape-changing zone of the display to physically change shape in the target area to form a lens for visually magnifying information displayed in the target area.

8. The computer program product as claimed in claim 7 wherein the code is further adapted to perform steps of:
   detecting that the device is operating in navigation mode in which a map of a current position of the device is displayed on the display of the device;
   identifying the current position of the device onscreen; and
   defining the target area to encompass the current position of the device onscreen.

9. The computer program product as claimed in claim 7 wherein the code is further adapted to perform steps of:
   detecting a route on a map that is displayed on a display of the device;
   identifying a starting point of the route and a destination point of the route;
   defining the target area to encompass the starting point; and
   dynamically redefining the target area as the target area is displaced over the route from the starting point to the destination point.

10. The computer program product as claimed in claim 7 wherein the code is further adapted to perform the steps of:
    detecting a route on a map that is displayed on a display of the device; and
    statically defining the target area as encompassing an entire onscreen length of the route.

11. The computer program product as claimed in claim 7 wherein the code is further adapted to perform the steps of:
    receiving touchscreen input at an onscreen location of the display; and
    defining the target area to encompass the onscreen location.

12. The computer program product as claimed in claim 11 wherein the code is further adapted to perform the steps of:
    receiving another touchscreen input; and
    dynamically displacing the target area to encompass the other touchscreen input.

13. A handheld electronic device comprising:
    a shape-changing touch-sensitive display screen comprising an array of shape-changing zones, each shape-changing zone being individually electrically actuatable to expand into a convex shape defining an adaptive magnifying lens that visually magnifies an area of the display screen beneath the lens; and
    a processor operatively coupled to memory for executing an application configured to present information on the touch-sensitive display screen of the device and for controlling actuation of the one or more shape-changing zones of the touch-sensitive display screen.

14. The handheld electronic device as claimed in claim 13 further comprising a radiofrequency transceiver for requesting and downloading map data for displaying a map on the touch-sensitive display screen.

15. The handheld electronic device as claims in claim 14 further comprising a Global Positioning System (GPS) receiver for determining a current position of the device and for supplying the current position to a map application executing on the processor in order to download and display the map of the current position on the touch-sensitive display screen, wherein the processor causes actuation of the shape-changing zones to form a lens above the current position to thereby magnify the current position on the map.

16. The handheld electronic device as claimed in claim 14 wherein the processor is configured to display a route on a map and to cause a plurality of shape-changing zones all along the route to concurrently expand into a magnifying lens.

17. The handheld electronic device as claimed in claim 14 wherein the processor is configured to display a route on a map and to sequentially actuate a plurality of shape-changing zones along the route to form a moving lens that moves along the route from a starting point to a destination point.

18. The handheld electronic device as claimed in claim 13 wherein one or more shape-changing zones are actuated at an onscreen location of the touch-sensitive display screen in response to touchscreen input received at the onscreen location.

19. The handheld electronic device as claimed in claim 13 wherein one or more shape-changing zones are actuated sequentially in response to receipt of multiple sequential touchscreen inputs due to touching and dragging over the display.

* * * * *